(12) United States Patent
Mansir et al.

(10) Patent No.: US 12,424,844 B2
(45) Date of Patent: Sep. 23, 2025

(54) CURRENT-CONTROLLED CIRCUIT BREAKER FOR ELECTRICAL SUBMERSIBLE PUMP MOTOR LEADS

(71) Applicant: Halliburton Energy Services, Inc., Houston, TX (US)

(72) Inventors: Hassan Mansir, Frimley (GB); Andras Bencze, Frimley (GB); Robert Charles De Long, Tulsa, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 74 days.

(21) Appl. No.: 18/477,152

(22) Filed: Sep. 28, 2023

(65) Prior Publication Data

US 2025/0112457 A1    Apr. 3, 2025

(51) Int. Cl.
*H02H 7/22* (2006.01)
*H02H 1/00* (2006.01)

(52) U.S. Cl.
CPC .......... *H02H 7/226* (2013.01); *H02H 1/0007* (2013.01)

(58) Field of Classification Search
CPC .. H02H 7/226; H02H 1/0007; E21B 41/0085; E21B 17/003; E21B 4/04; H02P 29/027; H02P 29/025; H02P 7/06
See application file for complete search history.

(56) References Cited

U.S. PATENT DOCUMENTS

| | | | | |
|---|---|---|---|---|
| 2,856,006 A | * | 10/1958 | Buck ........................ | E21B 47/10 166/66.4 |
| 2,915,739 A | * | 12/1959 | Buck ........................ | E21B 47/06 340/854.3 |
| 11,171,580 B2 | * | 11/2021 | Duerr ....................... | H02P 27/045 |
| 12,057,796 B2 | * | 8/2024 | Li ............................. | H02P 29/027 |
| 2007/0291426 A1 | | 12/2007 | Kasunich et al. | |
| 2010/0302700 A1 | | 12/2010 | Kellis et al. | |

(Continued)

FOREIGN PATENT DOCUMENTS

| | | | | |
|---|---|---|---|---|
| CN | 102449261 A | * | 5/2012 | ........... E21B 43/128 |
| CN | 110366622 A | * | 10/2019 | ............... E02B 9/00 |

OTHER PUBLICATIONS

"PCT Application No. PCT/US2023/075641, International Search Report and Written Opinion", Jun. 14, 2024, 10 pages.

*Primary Examiner* — Jared Fureman
*Assistant Examiner* — Nicolas Bellido
(74) *Attorney, Agent, or Firm* — DeLizio, Peacock, Lewin & Guerra LLP

(57) ABSTRACT

Some implementations include an apparatus configured to, in a wellbore, eliminate voltage on one or more first conductors that are electrically connected to a surface-based power source. The apparatus may include a shorting ring electrically connectable to the first conductors and configured to electrically short the first conductors upon establishing an electrical connection with the first conductors. The apparatus may include a solenoid assembly to actuate in response to power on the first conductors from the surface-based power source. The apparatus may include a pin slider assembly connected to the first conductors and configured to move, in response to actuation by the solenoid assembly, between an electrical connection with the shorting ring and an electrical connection with one or more second conductors that have an electrical connection with a permanent magnet motor winding in the wellbore.

21 Claims, 23 Drawing Sheets

(56) References Cited

U.S. PATENT DOCUMENTS

2017/0373613 A1 12/2017 Duerr et al.
2020/0358381 A1 11/2020 Galic
2023/0231505 A1 7/2023 Li

* cited by examiner

CURRENT-CONTROLLED CIRCUIT BREAKER FOR ELECTRICAL SUBMERSIBLE PUMP MOTOR LEADS

TECHNICAL FIELD

This disclosure relates generally to the field of pumping. More particularly, this disclosure relates to the field of electric submersible pumps for use downhole in a well. Still more particularly, this disclosure relates to downhole motors of the sort which may be used in electric submersible pumps, and to improve their operation.

BACKGROUND

Permanent magnet motors (PMM) are becoming an effective power source for downhole applications in the electrical submersible pump systems. This type of motor uses permanent magnets as part of a rotor assembly which may provide several advantages over the conventional induction machines. The advantages may include constant torque over a large speed range, higher power density per unit of active length, higher efficiency, no slip during operation, and more.

Because the magnets may be electromagnetically permanently coupled with a stator winding, the rotor may spin as soon as electric power is supplied to the stator winding. In turn, when the rotor is rotated by an external load (such as a fluid passing through the pump during install/retrieval), the PMM may generate voltage in the stator windings that will energize the cable and any connected surface equipment. This voltage induced by the shaft rotation of the rotor may pose a health and safety risk to the personnel carrying out work on the powerlines to surface and on the surface equipment. The voltage also may damage equipment that is not protected against voltage surge.

BRIEF DESCRIPTION OF THE DRAWINGS

Implementations of the disclosure may be better understood by referencing the accompanying drawings.

DESCRIPTION OF IMPLEMENTATIONS

The description that follows may include example systems, methods, techniques, and program flows that embody implementations of the disclosure. However, this disclosure may be practiced without these specific details. For clarity, some well-known instruction instances, protocols, structures, and techniques may not be shown in detail.

Overview

Subsurface operations may involve an electrical submersible pump (ESP) residing in wellbore. The ESP may pump fluids from a subsurface formation to the surface. The ESP may be powered by transmitting power from a surface-based power source over conductors that are electrically connected to the ESP. When the ESP is not being used (not being powered via the surface-based power source), the ESP motor itself may energize the conductors because downhole fluid movements may cause the ESP's rotor to spin and induce back E.M.F (voltage produced in a PMM as the result of the rotor rotation) in the conductors.

Some implementations relate to a circuit breaker assembly configured to eliminate voltage on conductors electrically connected to a downhole permanent magnet motor (PMM) and to surface equipment, where the voltage may be produced by unintended rotation of components in the permanent magnet motor (PMM). The circuit breaker assembly may disconnect and ground a power connection while the PMM is not powered from the surface. The circuit breaker assembly also may connect the power connection only when the PMM is operated from surface by a variable speed drive (VSD) or when an ESP Electrical integrity test device is being used.

The circuit breaker assembly may include pin slider assembly that may be actuated by a solenoid actuator when the VSD at the surface starts the ESP operation. When the VSD is turned off, the pin slider assembly may automatically disconnect in response to lack of current supply to the solenoid. The pin slider assembly may disconnect with assistance from spring forces. When power pins of the pin slider assembly are disconnected, there is no physical contact between the winding of the PMM in the borehole and the conductor running to the surface.

Example Environment

The current-controlled circuit breaker assembly described herein may be part of a larger well system for recovering subsurface fluids (such as oil, natural gas, and others). Some well systems for recovering subsurface fluids may include an ESP and other components.

Figure 1:
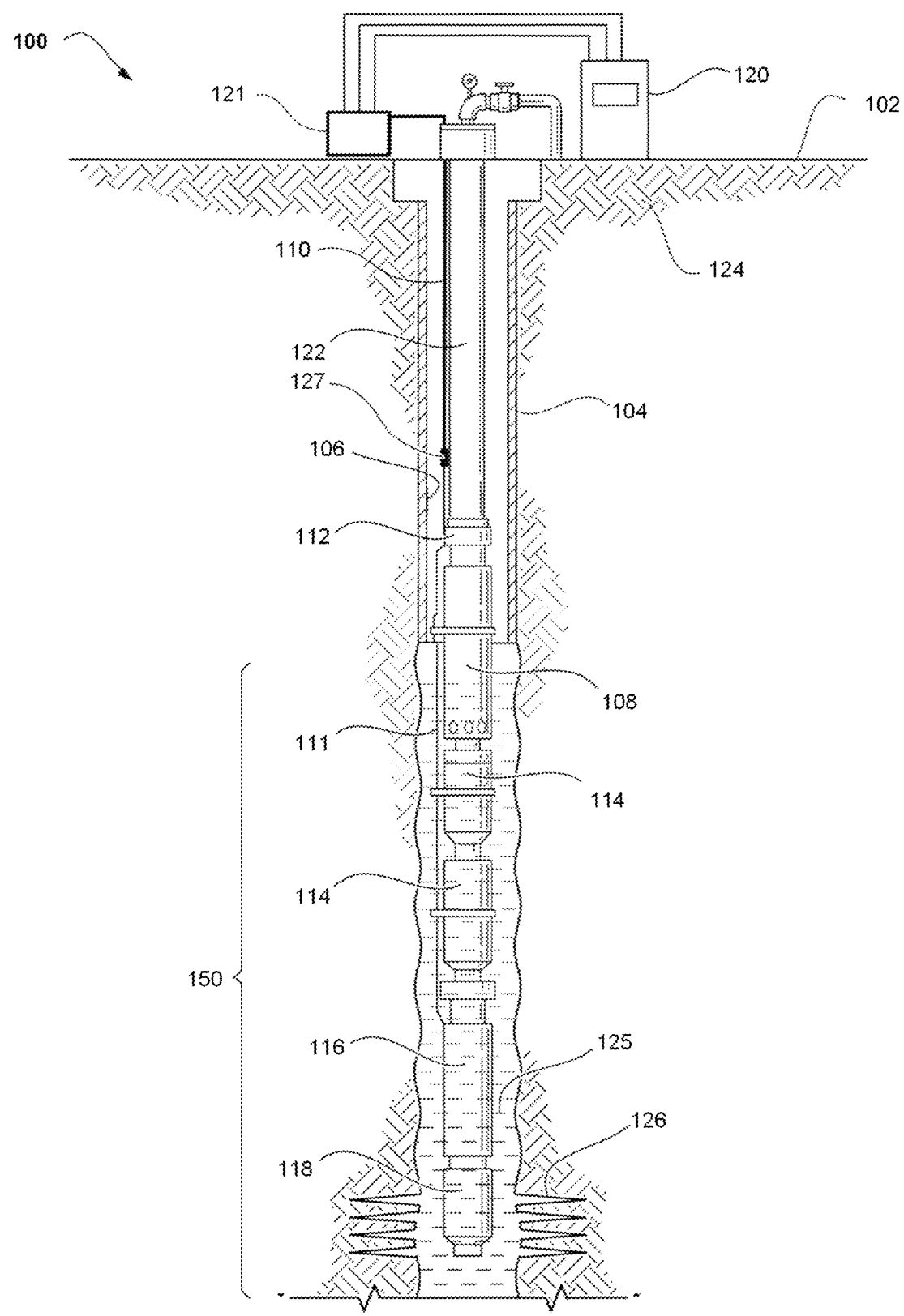
FIG. 1 is a diagrammatic representation of a well system.

FIG. 1 is a diagrammatic representation of a well system. The well system 100 may include an ESP. While the well system 100 illustrates a land-based subterranean environment, example implementations may include any well site environment including a subsea environment. Any one or more components or elements of the system 100 may be used with subterranean operations equipment located on offshore platforms, drill ships, semi-submersibles, drilling barges and land-based rigs.

The well system 100 may be positioned (at least partially) in a wellbore 104 below a surface 102 in a formation 124. The wellbore 104 may comprise a vertical, deviated, horizontal, or any other type of wellbore. The wellbore 104 may be defined in part by a casing 106 that may extend from the surface 102 to a selected downhole location. Portions of the wellbore 104 that do not comprise the casing 106 may be referred to as open hole.

Various types of hydrocarbons or fluids may be pumped from the wellbore 104 to the surface 102 using a pump system 150 positioned downhole (such as within, partially within, or outside the casing 106 of the wellbore 104). The well system 100 may include an electrical cable 110 (such as a round cable) and a motor lead extension (MLE) 111 (such as a flat cable).

The pump system 150 may include a pump 108, a pump discharge 112, one or more protectors (seal sections) 114, a motor 116, and a downhole sensor 118. The pump 108 may be an ESP, including but not limited to, a multi-stage centrifugal pump, a rod pump, a progressive cavity pump, any other suitable pump system or combination thereof. The pump 108 may transfer pressure to the fluid 125 or any other type of downhole fluid to boost the fluid from downhole to the surface 102 at a selected pumping rate. The motor 116 may be a permanent magnet motor (PMM) or other suitable motor to drive the pump 108 and may be coupled to at least the downhole sensor 118. The MLE 111 may be coupled to the motor 116. The MLE 111 may connect into a connector at the motor pothead 116. The connector may be coupled to the motor 116 at the surface by an operator prior to deployment in the wellbore 104. The electrical cable 110 may provide power to the motor 116 via the splice 127 and the MLE 111, transmit one or more control or operation instructions from the variable speed drive (VSD) 120 to the motor 116, or both. The electrical cable 110 may be communicatively coupled to the VSD 120 through a junction box or transformer 121 disposed at the surface 102.

The ESP 150 may include an electric submersible motor configured or operated to turn the pump 108 and may, for example, be a two or more-pole, three phase, a hybrid or a simple rotor construction, permanent magnet motor (PMM). However, other motor configurations may be utilized. A production tubing section 122 may couple directly to the discharge 112 of the pump 108. Any one or more production tubing sections 122 may be coupled together to extend the pump system 150 into the wellbore 104 to a desired or specified location.

Figure 2:
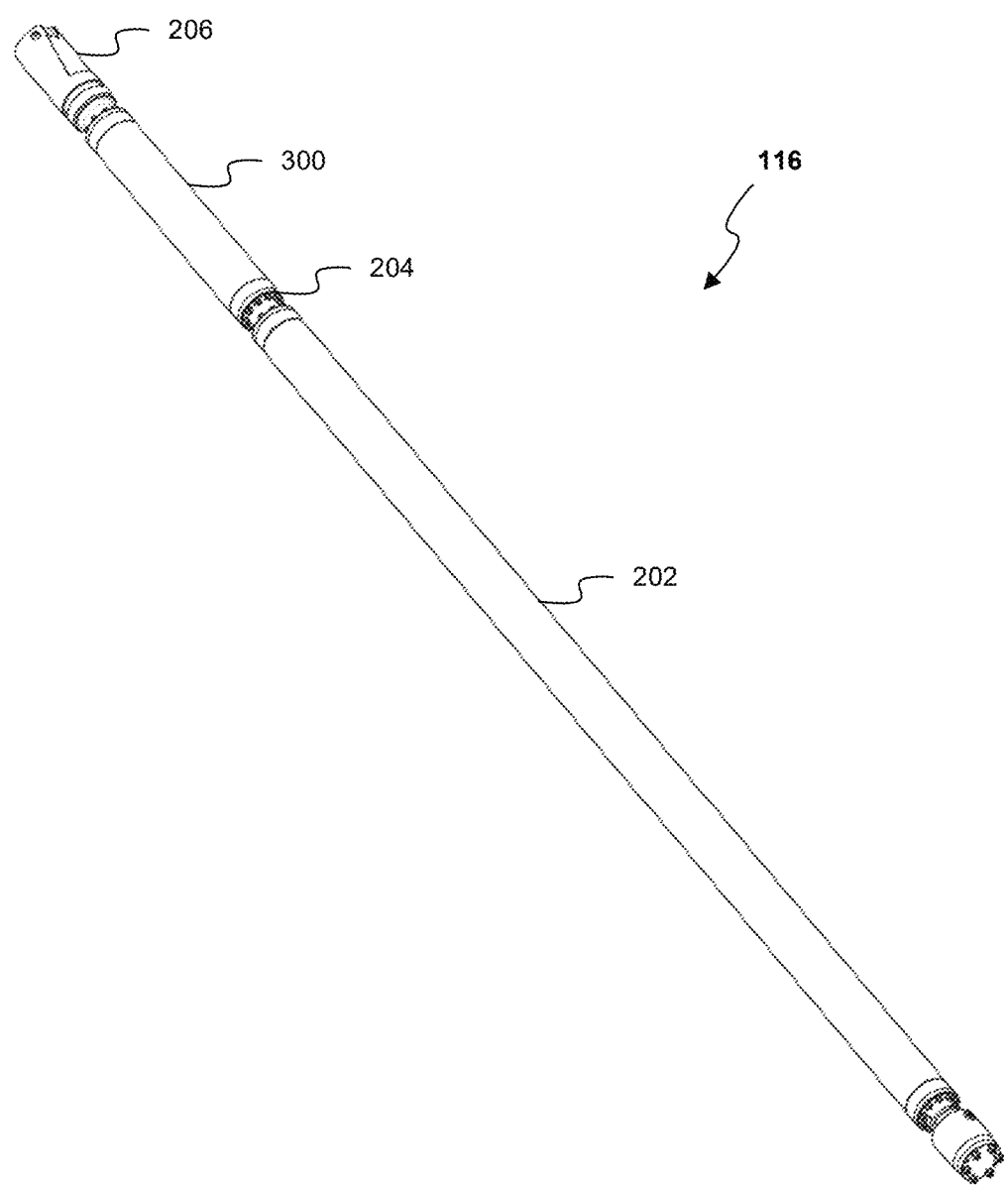
FIG. 2 is a perspective view showing an ESP motor.

FIG. 2 is a perspective view showing an example motor of an ESP. The motor 116 may include a stator 202, a flanged crossover assembly 204, a current-controlled circuit breaker assembly 300, a motor head 206 connected to the fixed structure of the ESP (i.e. the housing of the protector) and a rotor (not shown) which may be coupled to a rotating element of the ESP (i.e. the power transmission shaft of the protector).

In an alternate embodiment, the current-controlled circuit breaker assembly 300 may be integral part of the stator 202, thus not requiring the flanged cross over 204 to connect to the stator 202.

Figure 3:
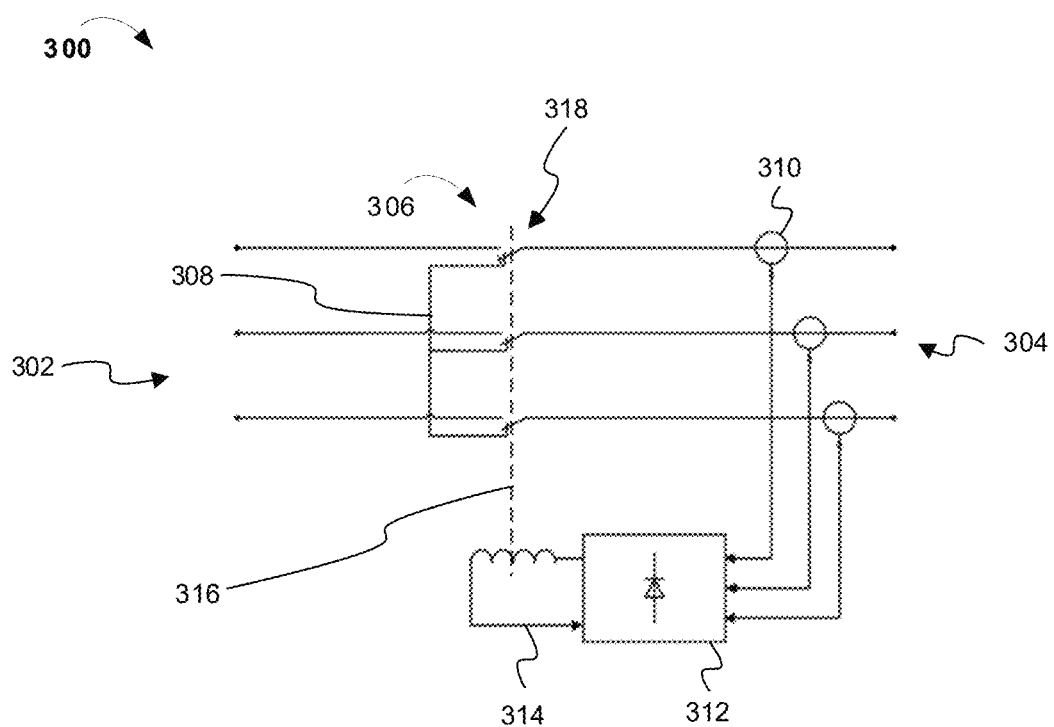
FIG. 3 is a diagram showing an example of a current-controlled circuit breaker arrangement.

FIG. 3 is a diagram showing an example current-controlled circuit breaker assembly. In some implementations, the circuit breaker assembly 300 may be packaged as a standalone unit and may be easily integrated onto the motor. In some implementations, the current-controlled circuit breaker assembly 300 may be used in any suitable ESP system (such as the system 100 shown in FIG. 1). In a conventional three-phase system (i.e., a downhole motor), an MLE 111 may be spliced onto a surface power cable to connect a motor winding through a pothead connection 304. The breaker mechanism 306 may join motor winding 302 and the leads of pot head 304, whereby the connection between the leads of pothead 304 and the motor winding is normally open, and the leads of pothead 304 are shorted by the shorting ring 308. When the VSD is operated from the surface, each of the leads of pothead 304 conducts a separate phase of the three-phase current from the pothead connection 304. The current may be flowing through each of the leads of pothead 304, power pins 318, and the shorting ring 308. Each phase of current may be picked up by current transformers 310 surrounding each lead of pothead 304. This current may be processed by the full rectification unit 312. The full rectification unit 312 may produce and supply a current signal to the solenoid assembly 314. The solenoid assembly 314 may be energized to cause a pin slider assembly 316 to close the circuit between the leads of pothead 304 and the motor winding 302 by connecting the power pins 318 to the winding 302 and concurrently disconnecting the shorting ring 308. The shorting ring 308 may be referred to as a "shorting device" or a "shorting and grounding device" and may have any suitable shape (not limited to a ring shape). The power pins 318 may include pins connected to the leads of pothead 304 and/or pins connected to the motor winding 302. The current transformers 310 may have a turn ratio selected to ensure the current supplied to the solenoid assembly 314 is sufficient throughout the operation of the motor. Although FIG. 3 shows a solenoid assembly 314, some implementations may utilize other suitable electromagnetic devices suitable for actuating the pin slider assembly 316.

Because of the electrical short created between the shorting ring 308 and connecting power pins 318 when the ESP is not operated (powered) from the surface variable speed drive (VSD), a custom test device may be implemented to check the electrical integrity of the motor winding during installation, operation, and retrieval of the ESP. The integrity of the surface power cable 110, the MLE 111, the pothead 304 and motor windings 302 may be verified with industry standard test equipment.

Figure 4:
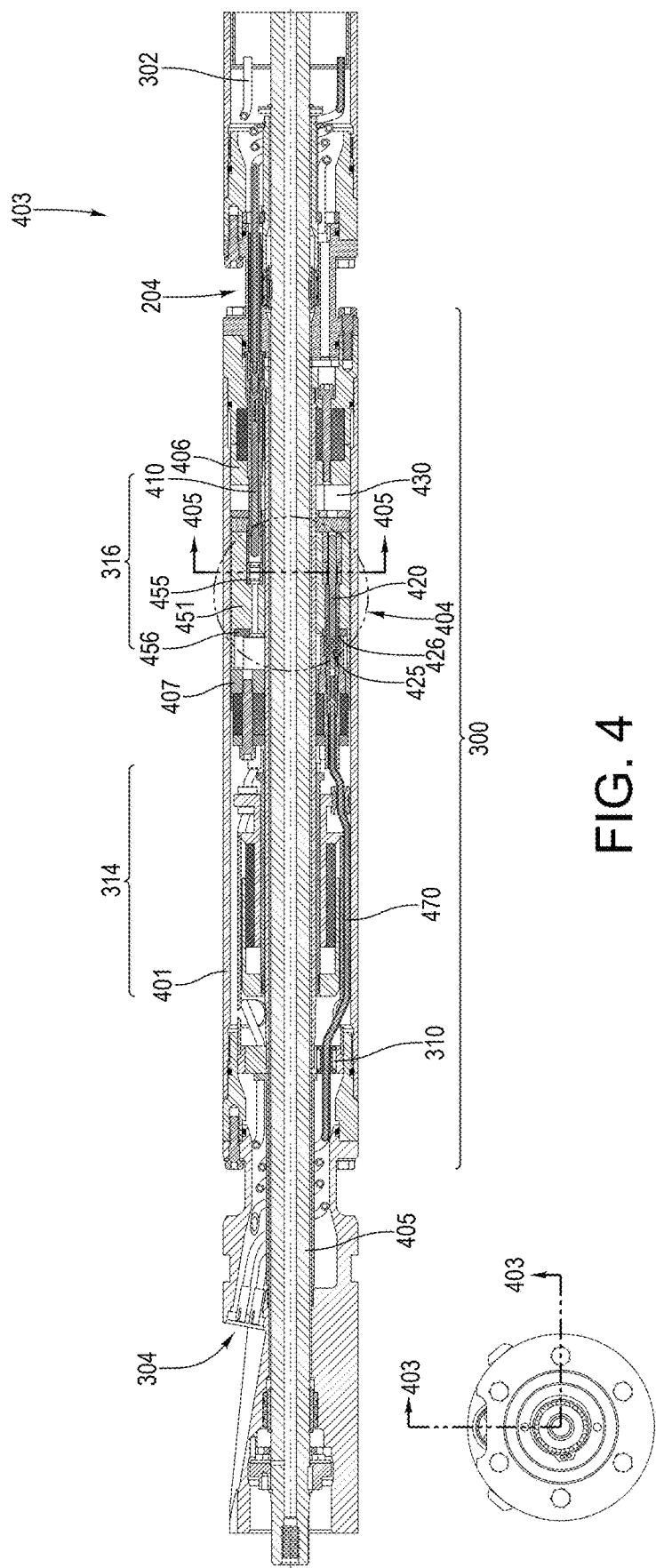
FIG. 4 is a diagram showing a longitudinal cross section through the electrical power pins of the current-controlled circuit breaker assembly in a fully retracted position (motor winding disconnected from surface power cable, power pins shorted by the shorting ring).

FIG. 4 is a diagram showing a longitudinal cross section through the electrical power pins of the current-controlled circuit breaker assembly in a fully retracted position. The current-controlled circuit breaker assembly 300 (also referred to herein as "circuit breaker assembly") may be contained within a circuit breaker housing 401. In FIG. 4, the pin slider assembly 316 is depicted in fully retracted position, thus the power pins 410 may be connected to the motor winding 302 and may be de-coupled from the power pins 420 that are electrically connected to the pothead 304 via the leads 470. In this position, a gap 430 may be present between the pin slider assembly 316 and the pin holder housing 406. The distance of the gap may be based on a required length of engagement between the power pins 410 and the contact block 455. In some implementations, the gap 430 is 19 mm, but the gap 430 could be any suitable distance (such as between 5 mm and 100 mm). In this position of the pin slider assembly 316, all power pins 420 are connected to the shorting ring 456 via the shorting ring contact springs 425 and contact sleeves 426 (see also FIG. 5), thus creating a short circuit on the pothead 304. The power pins 420 may be permanently engaged with the contact blocks 455 and the power pins 410 may be engaged with and disengaged from the contact blocks 455 depending on the position of the pin slider assembly 316. All the electrical pins and contacts may be contained in the electrically insulating housing 451. The pin slider assembly 316 also may include pin holder housings 406 and 407.

The electrical contact between the moving power pins 410 and 420 and the contact block 455 may be achieved by louvered contact band mounted inside the contact block 455. To ensure reliability of the connection, the sliding surfaces of the power pins 410 and 420 and the louvered contact band may be hard gold plated. Different copper alloys may be used for the electrically conductive components, but the preferred option may be to use Tellurium Copper for the power pins and Beryllium Copper for all the spring type elements in this system. In an alternate embodiment, the conductors may be manufactured from other copper-based alloys and plating types and their combination.

All the electrical pins and contacts may be held in a pin slider housing 451. This insulator housing may be made of PEEK or reinforced PEEK variants but could also be made from other organic insulator material or ceramic material for elevated temperatures. All pins 410 and 420 and their connecting leads may be individually insulated with the materials mentioned above to meet the standards for electrical insulation and tracking length. It is not the purpose of this disclosure to detail the insulation system of this device.

In FIG. 4, a rotating shaft 405 is depicted that may connect to a protector (seal section) (not shown in FIG. 4). FIG. 4 also shows the flanged crossover assembly 204.

Figure 5:
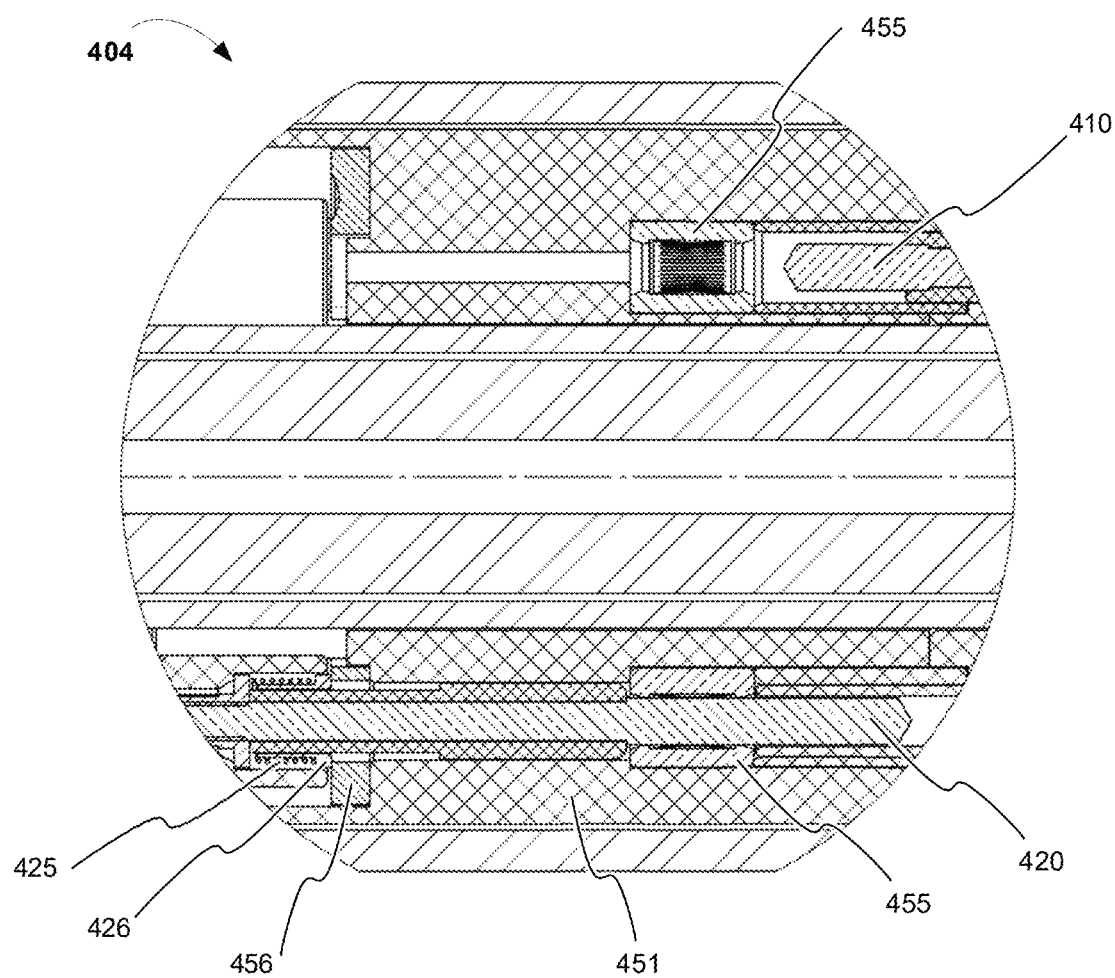
FIG. 5 is a diagram showing a close-up longitudinal cross sectional of the current-controlled circuit breaker assembly shown in FIG. 4.

FIG. 5 is a diagram showing a close-up longitudinal cross sectional of the current-controlled circuit breaker assembly shown in FIG. 4. In FIG. 5, the pin slider assembly 316 is depicted in a fully retracted position. FIG. 5 depicts the power pins 410 and 420, the contact block 455, the shorting ring contact spring 425, shorting ring 456, and contact sleeve 426 of one phase of the three-phase electrical circuit of the ESP motor. In the fully retracted position, the power pins 420 have an electrical connection with the shorting ring 456 via the shorting ring contact springs 425 and contact sleeves 426.

Figure 6:
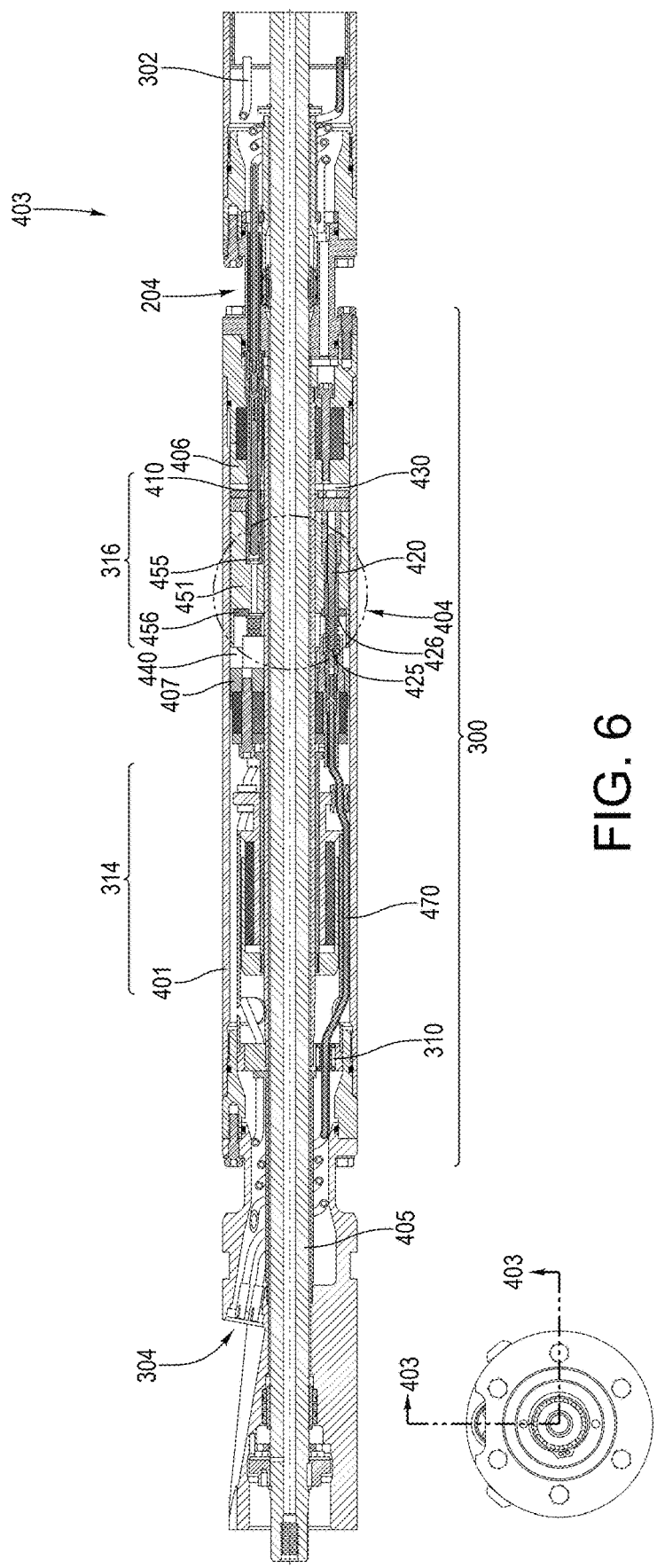
FIG. 6 is a diagram showing a longitudinal cross section through the electrical power pins of the current-controlled circuit breaker assembly in a partially extended position (motor winding connected to surface power cable, power pins still shorted by shorting ring).

FIG. 6 is a diagram showing the pin slider assembly in a transitional position. At this intermediate position, the power pins 420 may still be shorted by the shorting ring 456. At the same time, the power pins 410 may be partially engaged into the contact block 455 so that a secondary star point may be created in the electrical circuit (parallel circuit through the motor winding 302). The current may flow through the shorting ring 456 if there is a connection between the power pins 420 and the shorting ring 456. This short through the shorting ring 456 may remain until the power pins 410 are partially engaged into the contact blocks 455. The short may ensure that current is flowing from surface through the leads 470 so that the circuit breaker assembly 300 is supplied with current via the current transformers 310 and full rectification unit 312. The contact between the shorting ring contact springs 425 and contact sleeves 426 with the shorting ring 456 may cease shortly after this position of the pin slider assembly 316: the shorting ring 456 may dis-engage from the contact sleeves 426 as the pin slider assembly 316 continues its travel, and the contact sleeves 426 may stop against a shoulder present on the insulator of the power pin 420. The motor winding 302 may become the primary electrical circuit. For this circuit breaker to function, there may be a transition between the shorted phases and the motor winding electrical full circuit to ensure current flows without interruption to the rectification unit 312 through the leads 470 from the pothead 304. At this position, the gap 430 between the front-end face of the pin slider housing 451 and the pin holder housing 406 diminishes, while the gap 440 between the rear of the pin slider housing 451 and the second pin holder housing 407 slowly increases.

Figure 7:
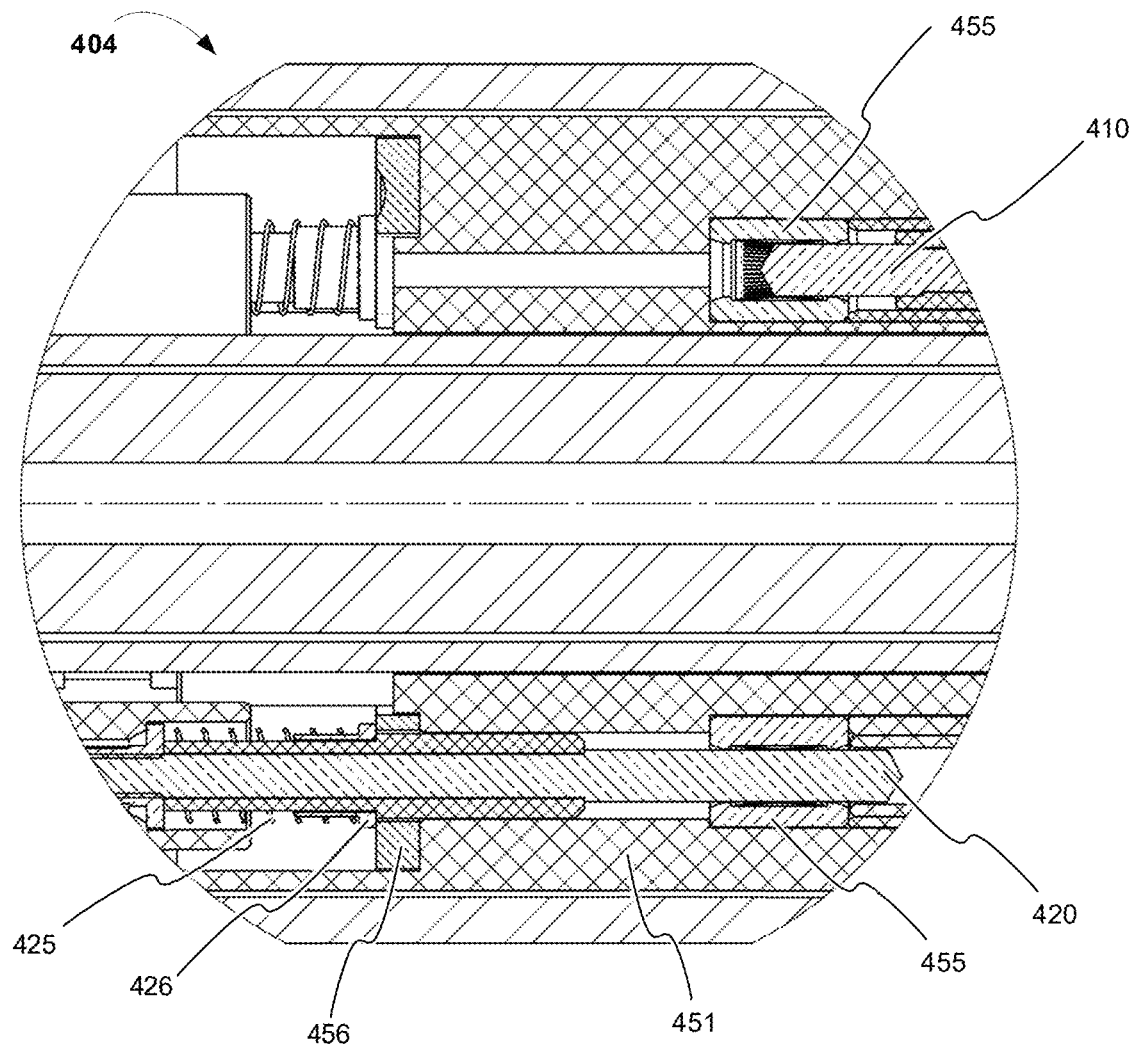
FIG. 7 is a diagram showing a close-up longitudinal cross sectional of the current-controlled circuit breaker assembly shown in FIG. 6.

FIG. 7 is a diagram showing a close-up longitudinal cross sectional of the current-controlled circuit breaker assembly shown in FIG. 6, where the pin slider assembly 316 is depicted in an intermediate position. FIG. 7 depicts the power pins 410 and 420, the contact block 455, the shorting ring contact spring 425, shorting ring 456, and contact sleeves 426 of one phase of the three-phase electrical circuit of the ESP motor. In this transient position, the power pins 420 have an electrical connection with the shorting ring 456 and the power pins 410 are partially engaged into the contact block 455.

Figure 8:
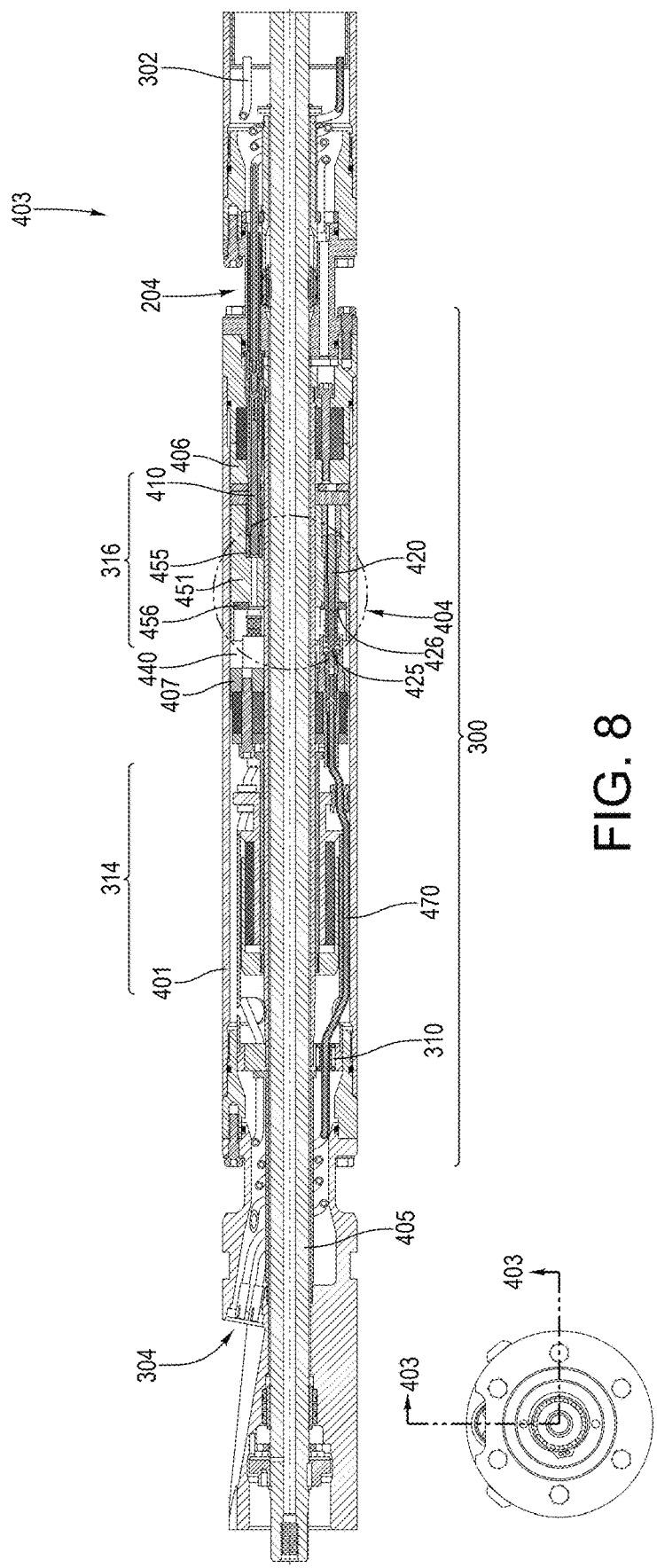
FIG. 8 is a diagram showing a longitudinal cross section through the electrical power pins of the current-controlled circuit breaker assembly in a fully extended position (motor winding connected to surface power cable, power pins not shorted by the shorting ring).

FIG. 8 is a diagram showing a longitudinal cross section through the electrical power pins of the current-controlled circuit breaker assembly in a fully extended position. In this position, the power pins 410 are fully engaged into the contact blocks 455 and connected with the power pins 420 through the individual contact blocks 455 in the pin slider assembly 316. FIG. 8 also shows components including the stator 202, the motor head 206, the lead 470 and the current transformer 310. At this point, the shorting ring 456 is already disconnected, no gap 430 is present (pin slider housing 451 end face in contact with the pin holder housing 406), gap 440 at the back side of the pin slider 451 is at its maximum.

Figure 9:
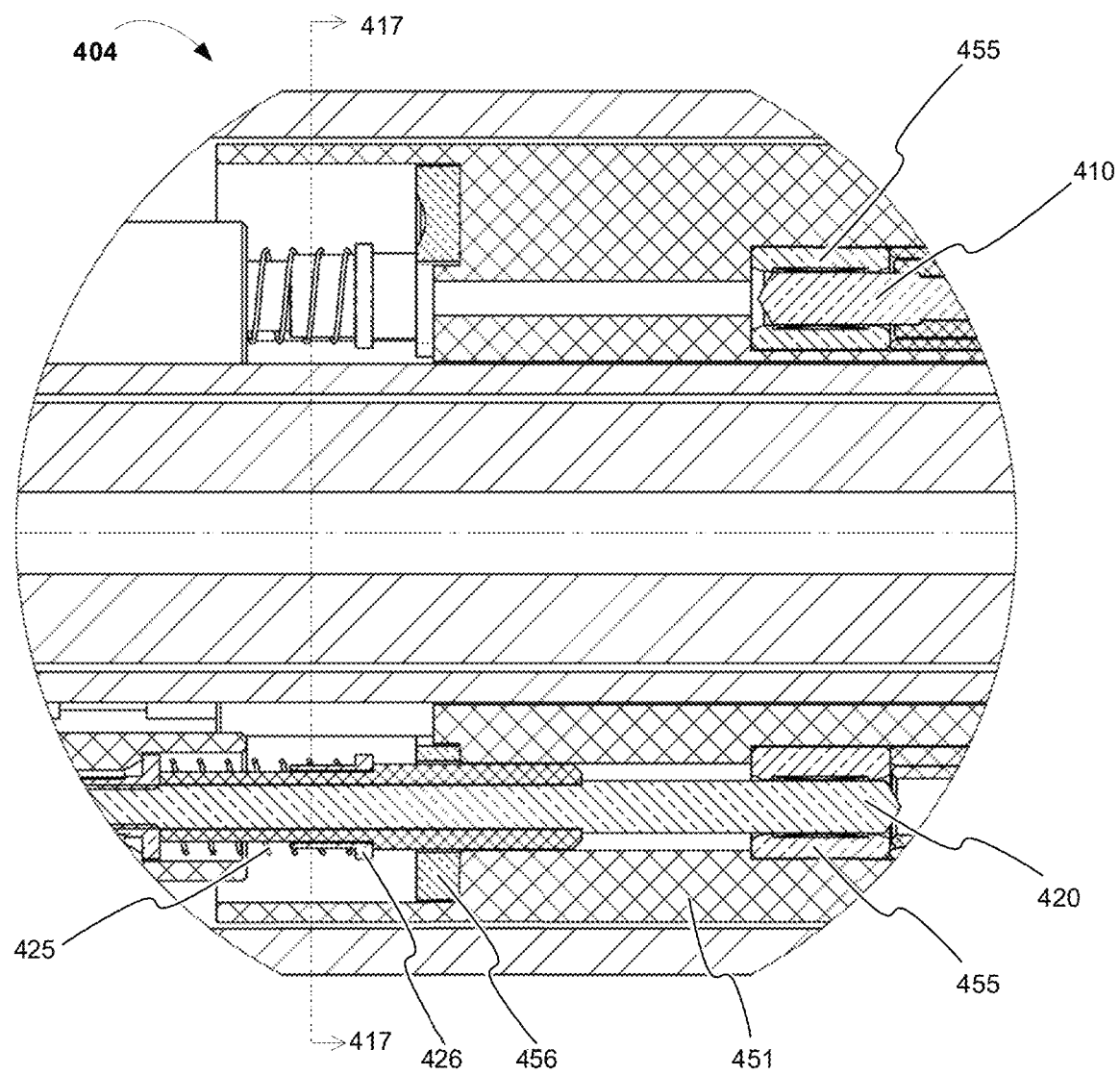
FIG. 9 is a diagram showing a close-up longitudinal cross sectional of the current-controlled circuit breaker assembly shown in FIG. 8.

FIG. 9 depicts a close-up longitudinal cross sectional of the current-controlled circuit breaker assembly in a fully extended position shown in FIG. 8. In this position, the power pins 420 are fully engaged into the contact blocks 455 and electrically connected with the power pins 410 through individual contact blocks 455 of the pin slider assembly 316. In this position, the shorting ring 456 is not shorting the power pins 420.

Figure 10:
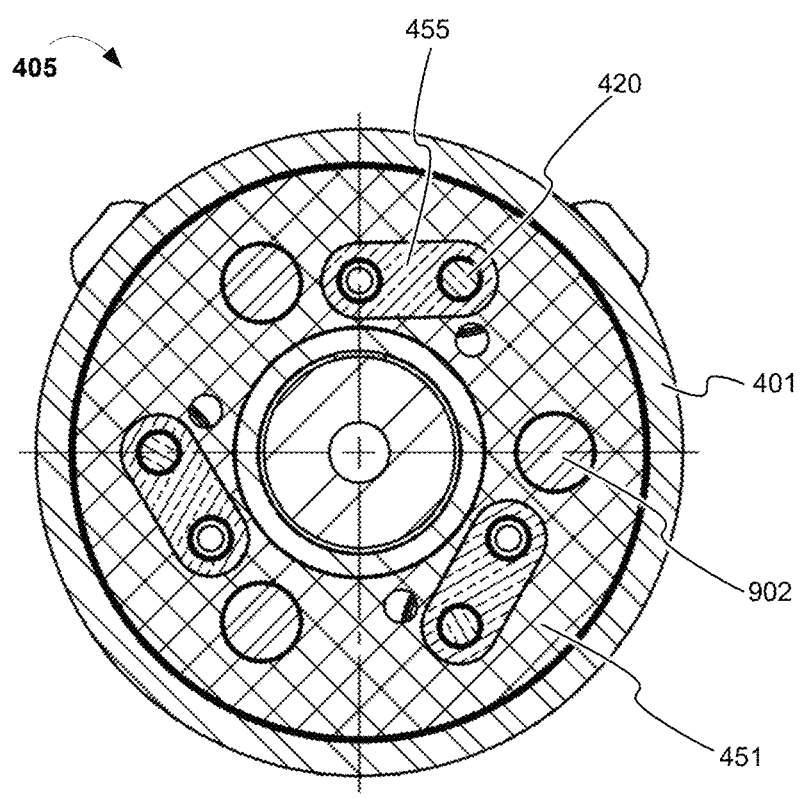
FIG. 10 is a diagram showing a radial cross-sectional view of the pin slider assembly in a fully retracted position.

FIG. 10 is a diagram showing a radial cross-sectional view of the pin slider assembly 316 in a fully retracted position. The pin slider assembly 316 may reside inside the circuit breaker housing 401. The pin slider assembly 316 may include the pin slider housing 451 and a plurality of contact blocks 455. In FIG. 10, the power pin 420 is visible inside the contact block 455 (hatched circular area inside the contact block 455). In the fully retracted position, the power pin 410 is not visible in the view shown in FIG. 10.

Figure 11:
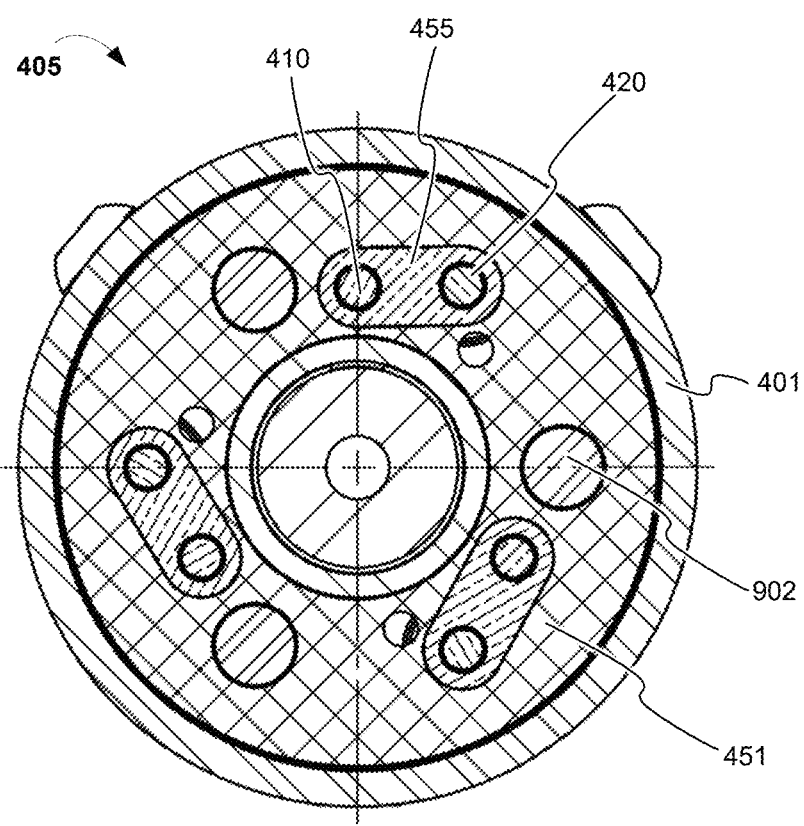
FIG. 11 is a diagram showing a radial cross-sectional view of the pin slider assembly in a fully extended position.

FIG. 11 is a diagram showing a radial cross-sectional view of the pin slider assembly in a fully extended position. In FIG. 11, both power pins 420 and 410 are visible inside the contact block 455 (both circular areas inside the contact block 455 are hatched).

Figure 12:
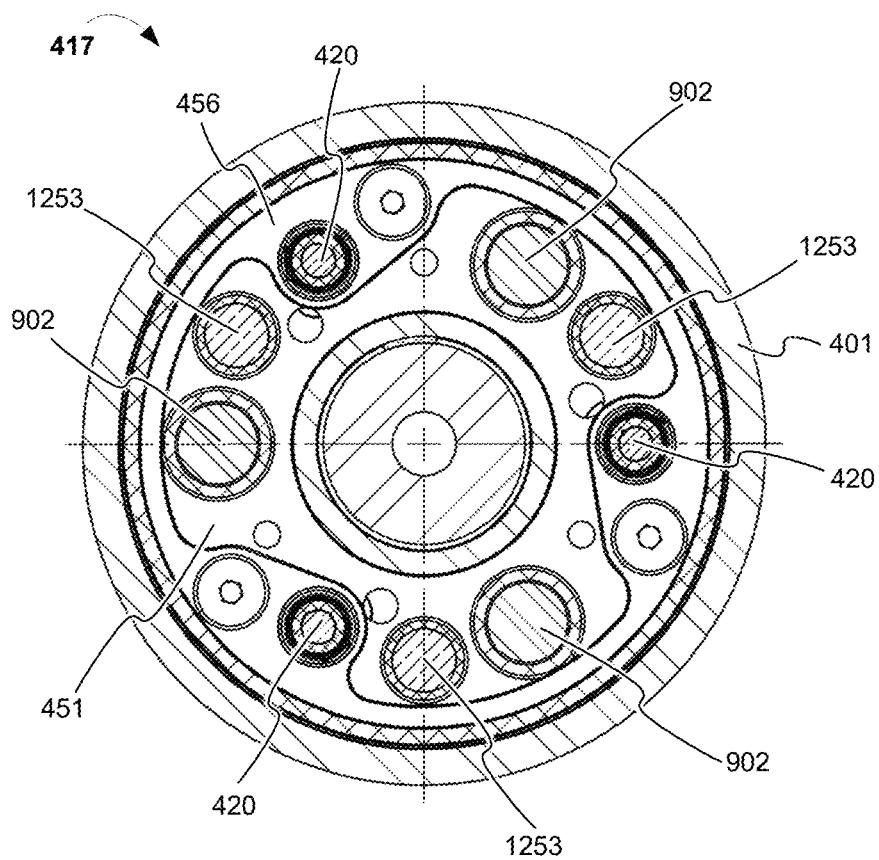
FIG. 12 is a diagram showing a view onto the rear side of the pin slider assembly.

FIG. 12 is a diagram showing a view onto the rear side of the pin slider assembly 316. This view also shows the circular shorting ring 456, pin slider housing 451, power pin 420, guide rods 902 and the connecting rods 1253.

Figure 13:
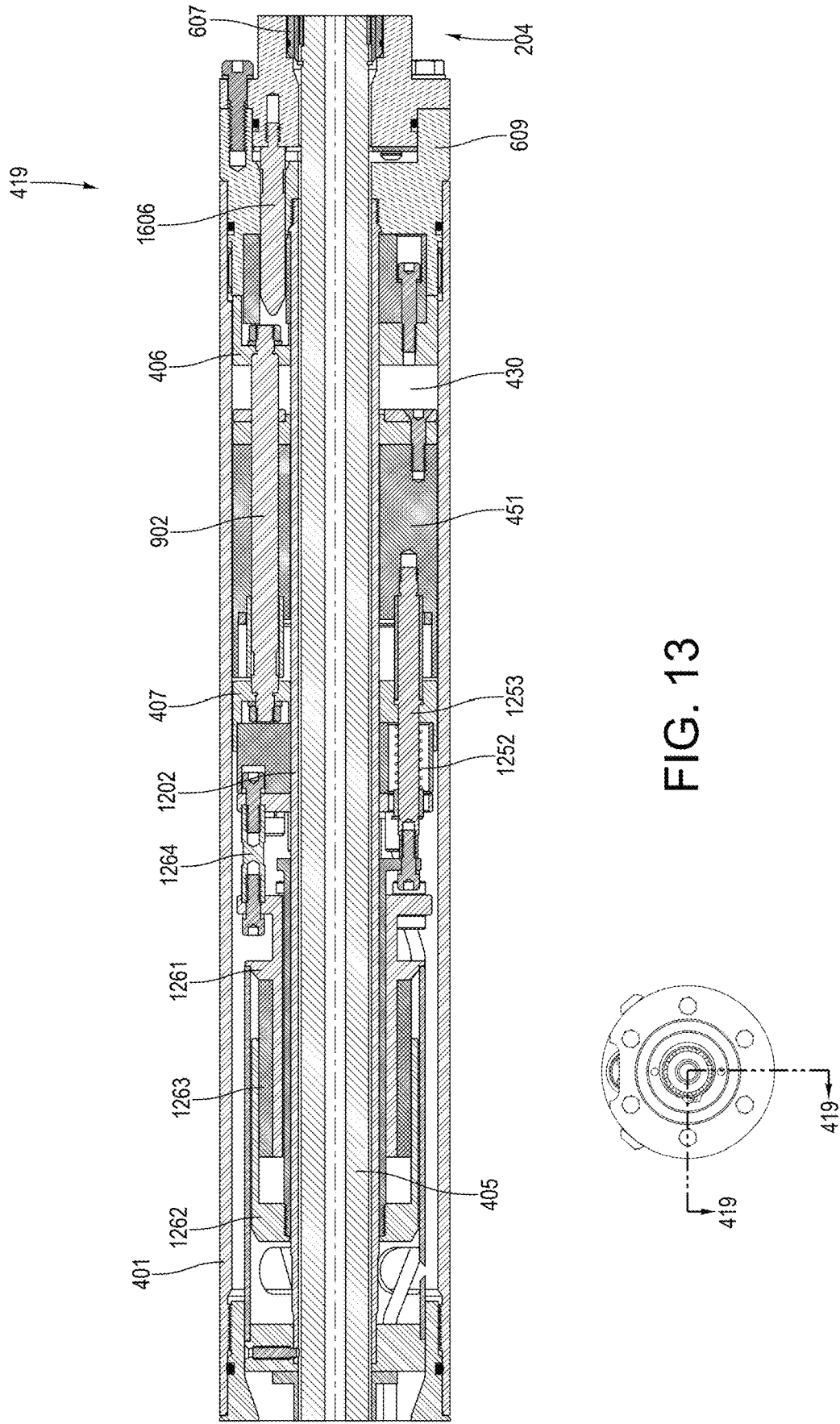
FIG. 13 and FIG. 14 are diagrams showing some example components of the circuit breaker assembly.
Figure 14:
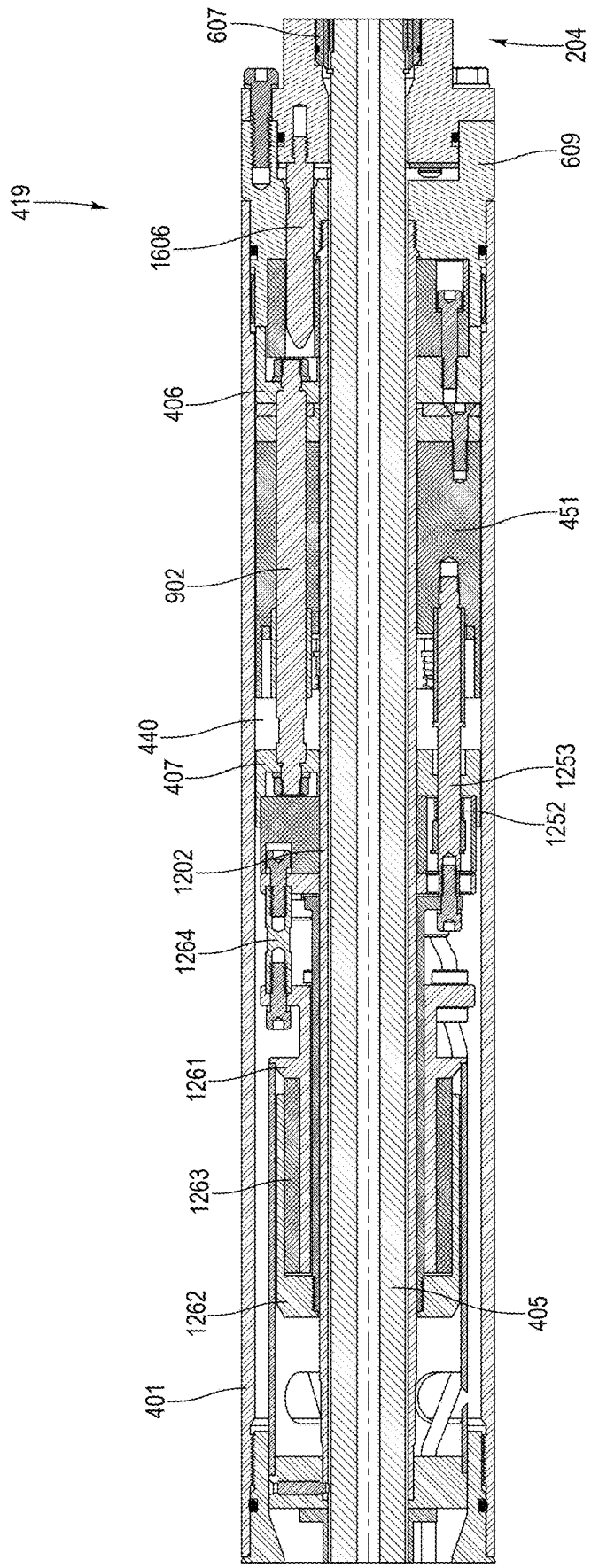
Figure 14:
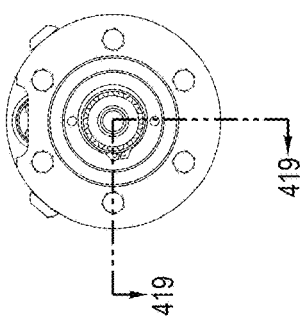

FIG. 13 and FIG. 14 are diagrams showing some example components of the circuit breaker assembly 300. The pin slider assembly 316 may be mounted on three guide rods 902 and glide on these to engage and dis-engage the power pins 410 and contact blocks 455. These rods extend between the pin holder housings 406 and 407 and provide the structure for the slider mechanism. The pin holder housings 406 and 407 are assembled on the shaft guard 1202 surrounding the rotating shaft 405. The pin slider assembly 316 may have at least 0.5 mm radial clearance to the circuit breaker housing 401 and the shaft guard 1202. The connecting rods 1253 connect the pin slider assembly 316 to the solenoid actuator assembly 314. The return springs 1252 mounted onto the connecting rods 1253 may provide the required force to move the pin slider assembly 316 back to its fully retracted position when the solenoid actuator assembly 314 is de-activated, dis-engaging the power pins 410 from the contact blocks 455 and re-connecting the shorting ring 456.

The solenoid actuator assembly 314 may include a slider tube 1261, a solenoid coil 1263, a plunger 1262 and support rods 1264. The connecting rods 1253 may be threaded into the pin slider housing 451 and also may be bolted to a flange of a slider tube 1261, thus providing a permanent mechanical coupling between the solenoid actuator assembly 314 and the pin slider assembly 316. In some implementations, movement of the plunger 1262, which may be mechanically secured onto the slider tube 1261 (i.e., threaded, bonded), may be transferred to the pin slider assembly 316, and any displacement generated by the return springs 1252 may move the plunger 1262.

The return springs 1252 may be selected based on the force requirement to return the pin slider assembly 316 to its fully retracted position when the solenoid assembly 314 is not activated. The force of return springs 1252 may overcome the spring forces generated by the shorting ring contact springs 425, the friction forces between the sliding components on the pin slider assembly 316, the contact forces between the power pins 410 and 420 and the louvered contact band of the contact blocks 455, the force of gravity acting on the pin slider assembly 316, solenoid slider tube 1261 and plunger 1262, as well as any hydraulic drag forces generated by moving components of the pin slider assembly 316 and the solenoid assembly 314 in the oil serviced motor 116. In some implementations, the force of the return springs 1252 may not exceed the electromagnetic force generated by the solenoid coil 1263 on the plunger 1262.

Furthermore, FIG. 13 and FIG. 14 depict one of the guide rods 1606 used to align the circuit breaker assembly 300 to the crossover assembly 204 according to one of the embodiments. FIG. 13 and FIG. 14 also show the rotating shaft 405, steadier journal bearing assembly 607 and housing adapter 609.

Figure 15:
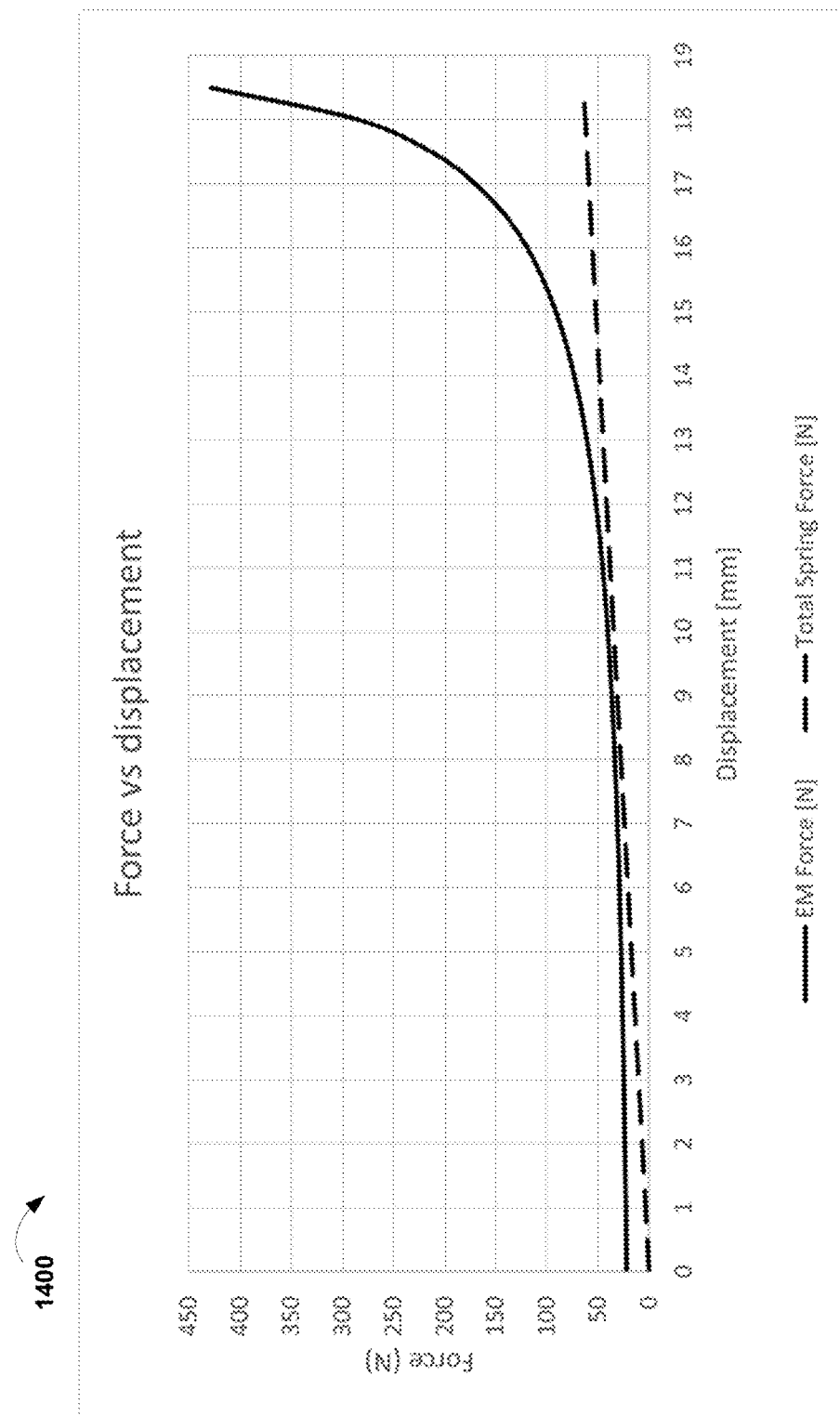
FIG. 15 is a graph showing an example of the spring force and EM force.

FIG. 15 is a graph showing an example of the spring force of the return springs 1252 and electromagnetic (EM) force generated by the solenoid coil 1263. The graph 1400 shows the EM force calculated for some implementations that have a displacement length of 19 mm. The EM force may be a function of the distance over which the plunger 1262 engages the coil 1263 and the current provided to the solenoid coil 1263 by the full rectification unit 312. The EM force calculation in this example is based on a current transducer ratio of 120:1 (i.e., 40 Amps mains current=0.333 Amps produced in the coil 1263), but this can be varied according to the force requirements in the circuit breaker assembly 300. The spring force for the spring 1252 is then selected so that, at any position of the plunger 1262, the spring force is lower than the EM force, but it will suffice to overcome all the mechanical forces mentioned above.

Figure 16:
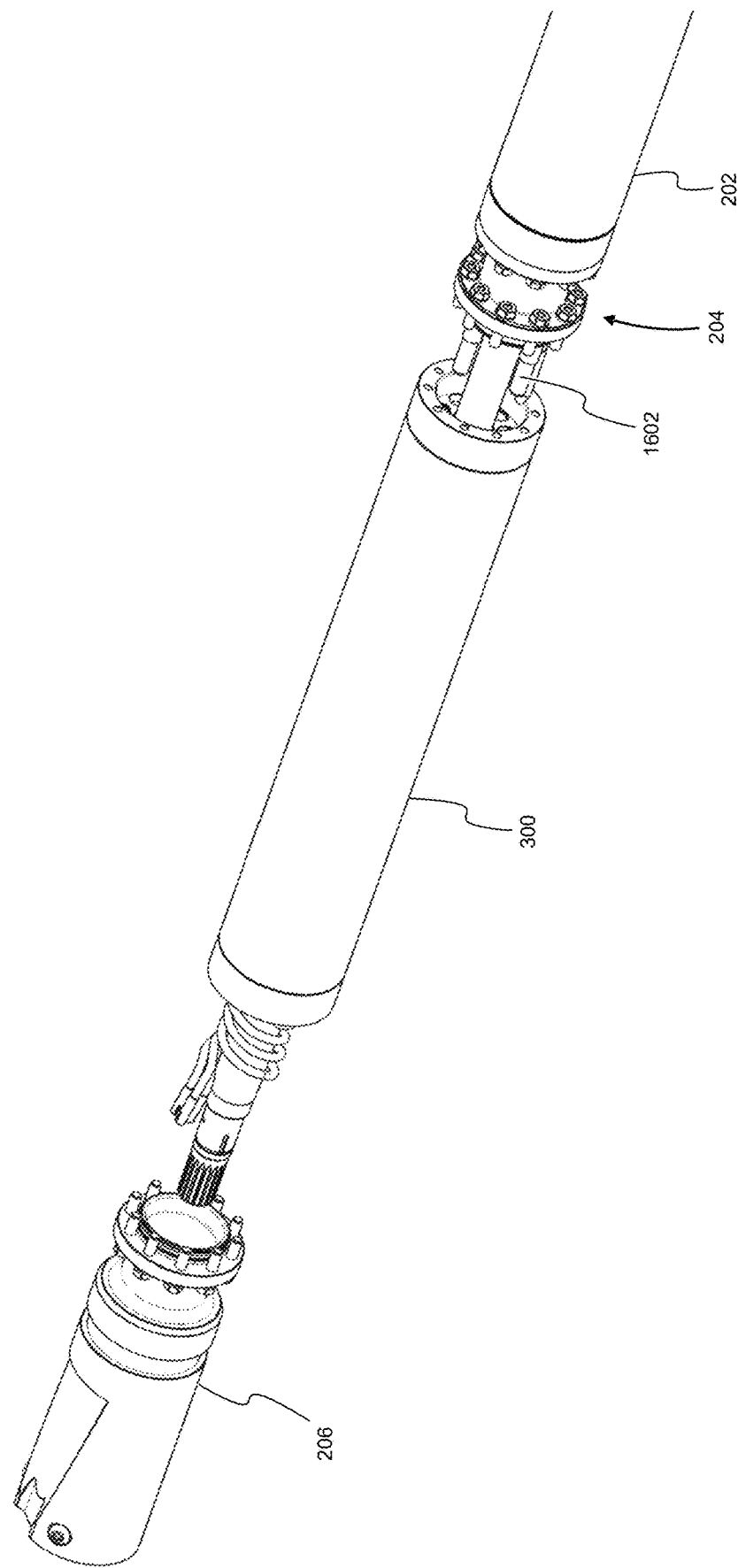
FIG. 16 is a perspective view showing the circuit breaker assembly coupled with the motor head and stator.

FIG. 16 is a perspective view showing the circuit breaker assembly 300 coupled with the motor head 206 and stator 202. The flanged crossover assembly 204 may be part of the stator 202. This sub-assembly may house a steadier journal bearing assembly 607 (not shown in FIG. 16, but visible in FIG. 13 and FIG. 14) and support plug-in connectors 1602 (also see FIG. 17) of the motor winding 302. Connecting the motor head 206 with the circuit breaker assembly 300 may follow standard motor head installation procedures.

Figure 17:
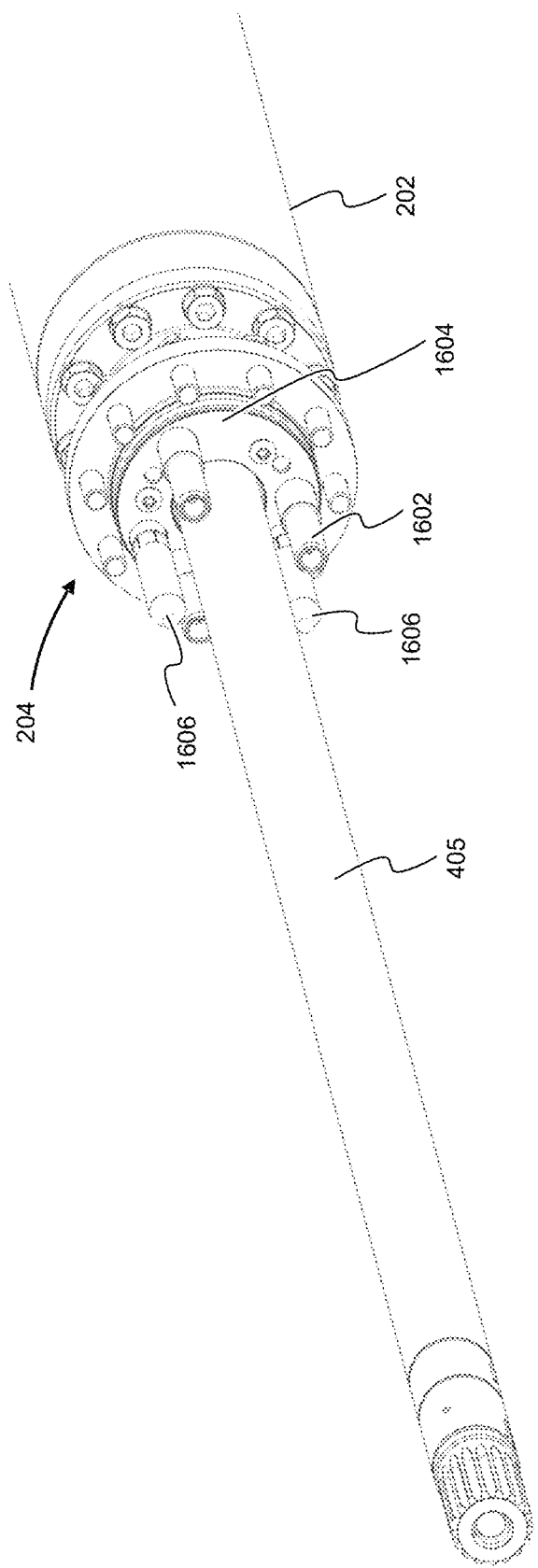
FIG. 17 is a diagram showing an interface between the stator and the circuit breaker assembly.

FIG. 17 is a diagram showing an example interface between the stator 202 and the circuit breaker assembly 300. Three plug-in connectors 1602 may be mounted into the flanged crossover assembly 204 and secured by the plate 1604. One, two or more guide rods 1606 may be used to ensure correct alignment and engagement of the circuit breaker assembly 300 with the stator 202. These may be threaded into the flanged crossover assembly 204 at pre-defined locations. FIG. 17 also shows a rotor 405 which may extend through the bore of the circuit breaker assembly 300 and it may be integral component of the rotor assembly installed into the stator 202.

In an alternate embodiment, the rotor may not extend through the circuit breaker assembly 300. The circuit breaker assembly 300 may have a separate shaft, supported by a plurality of steadier bearing assemblies 607 within the circuit breaker 300, and may connect to the motor shaft 405 via an industry standard coupling. Connecting the motor head 206 with the circuit breaker assembly 300 in such embodiment may follow standard motor head installation procedures. Details of this embodiment are not shown in this disclosure.

Figure 18:
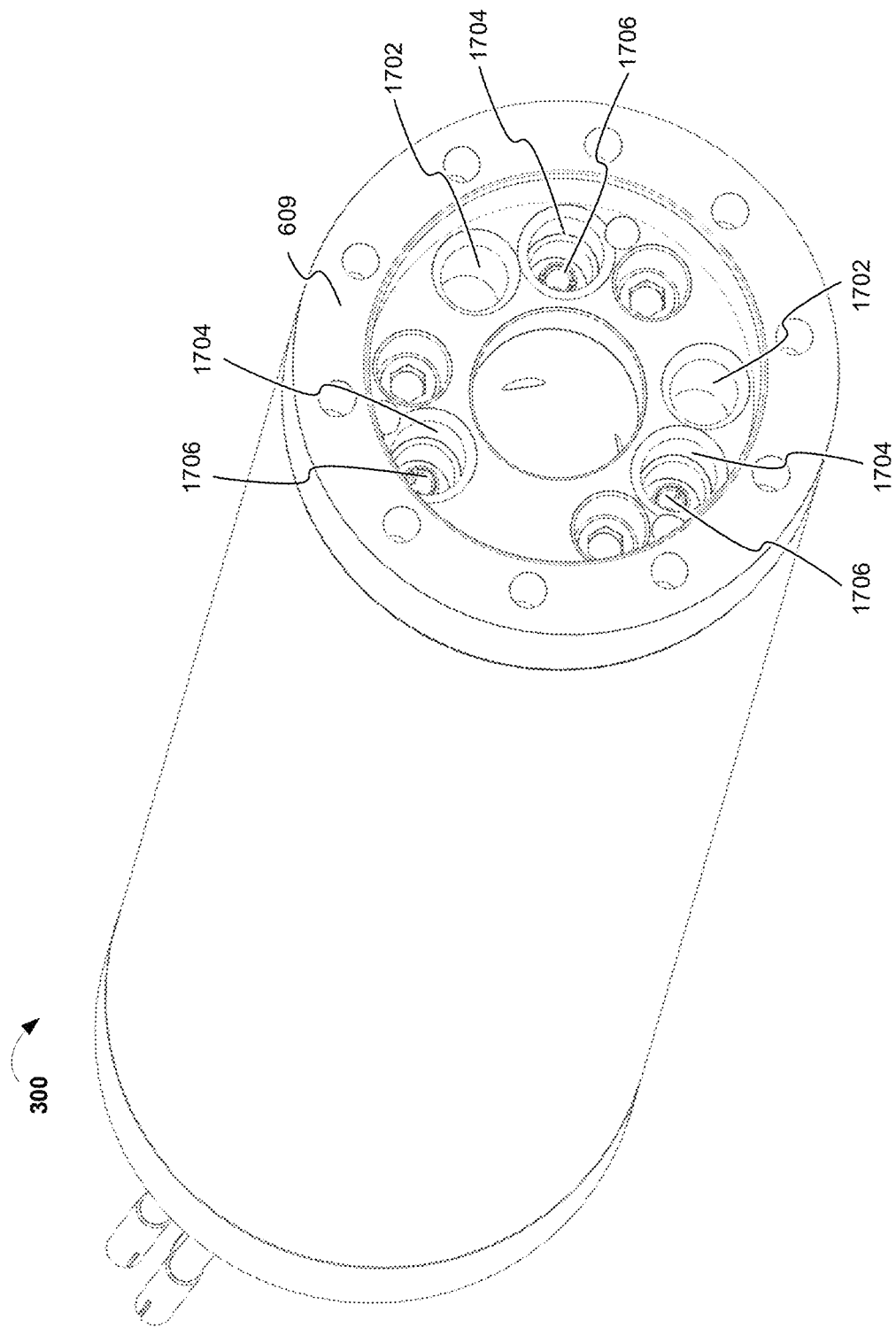
FIG. 18 is a diagram showing an interface of the circuit breaker assembly.

FIG. 18 is a diagram showing an example of interface of the circuit breaker assembly 300 with the stator 202. Guide rod holes 1702 may be present in pre-set locations on the housing adapter 609 and they may match the positions of the guide rods 1606 on the flanged crossover assembly 204. The plug-in connector cavities 1704 match the position of the plug-in connectors 1602 from the flanged crossover assembly 204 and they house the terminals 1706 of the power pins 410.

Figure 19:
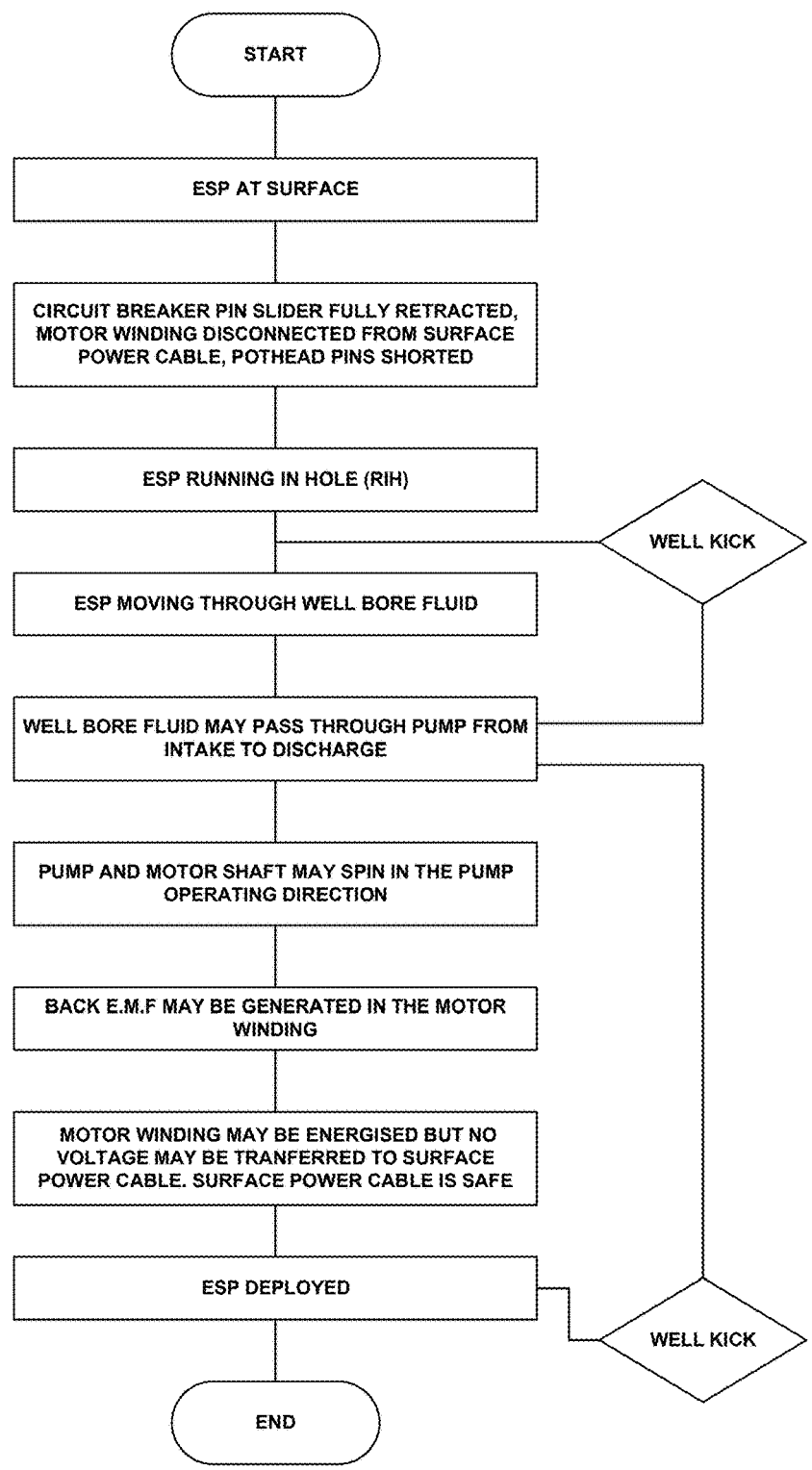
FIG. 19 is a flowchart showing operations of the current controlled circuit braker while ESP running in hole (RIH).

FIG. 19 is a flowchart showing example operation of the circuit breaker assembly 300 during the ESP installation into a well (running in hole or RIH). The flowchart 1900 shows that the ESP is initially at the surface. At the surface, the circuit breaker pin slider may be fully retracted, the motor winding may be disconnected from the surface power cable, and pothead pins may be shorted. Next, the ESP may be lowered into the borehole. The process may continue with the ESP moving through wellbore fluid or, if there is a well kick, wellbore fluid may be forced through the pump at elevated velocity, from the intake to the discharge of the pump, and through the production tubing to the surface. In both cases, the pump and motor shaft may spin in the pump operating direction. Back E.M.F may be generated in the motor winding. The motor winding may be energized but no voltage may be transferred to surface power cable, so the surface power cable is safe. Next, the ESP may continue RIH until it is deployed. If, at this point, there is a well kick, the process moves back to the stage at which wellbore fluid may pass through the pump from the intake to the discharge. If there is no well kick, the process may end.

Figure 20:
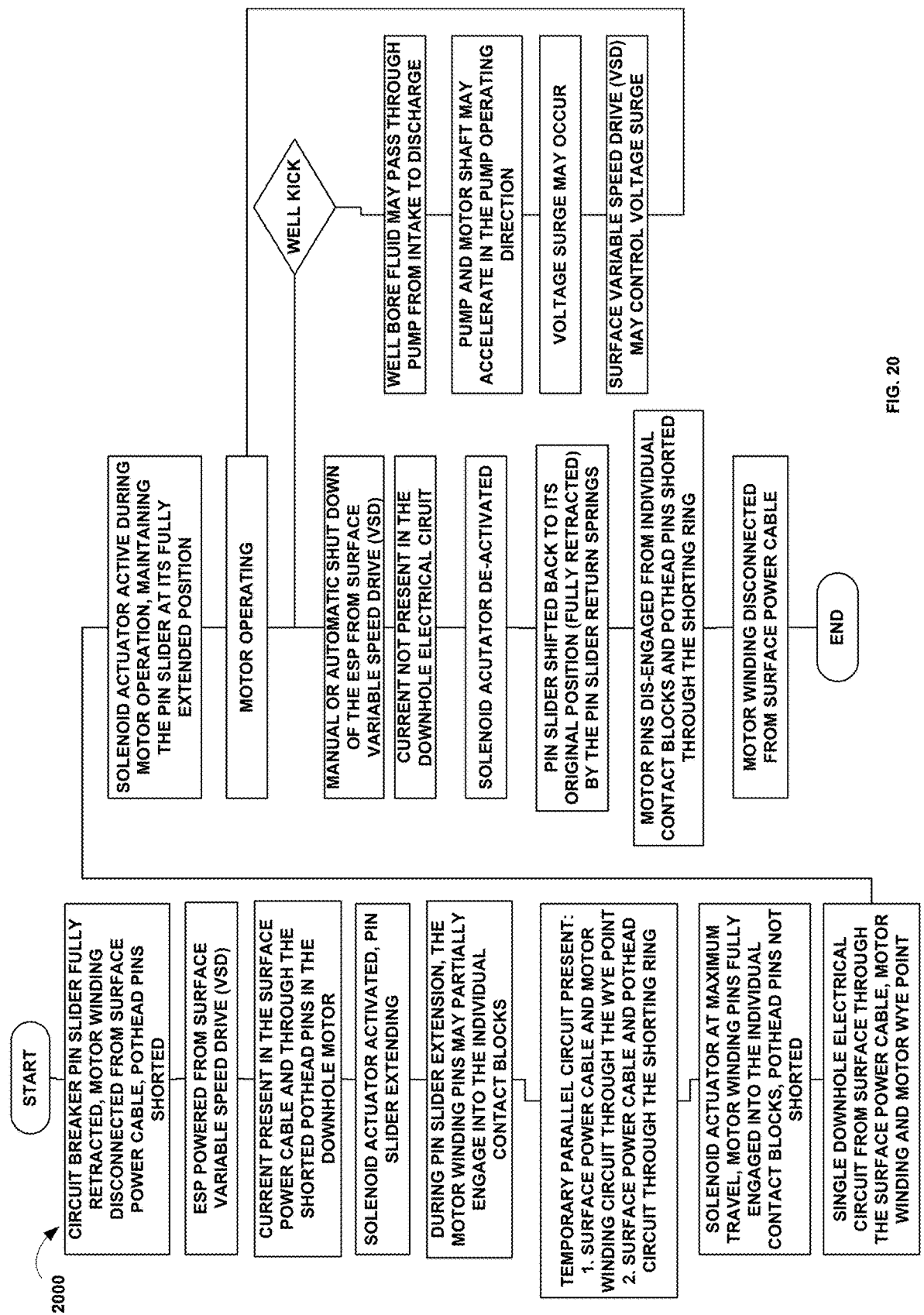
FIG. 20 is a flowchart showing operations of the current controlled circuit braker while the motor is deployed.

FIG. 20 is a flowchart showing example operation of the circuit breaker assembly 300 during the ESP normal operation (motor start up, operation and shut down). The flowchart 2000 may begin with the circuit breaker pin slider fully retracted, the motor winding disconnected from surface power cable, and the pothead pins shorted. The ESP may be powered from a surface variable speed drive. Electrical current may be present in the surface power cable and through the shorted pothead pins in the downhole motor. The solenoid actuator may be activated to extend the pin slider. During pin slider extension, the motor winding pins may partially engage into the individual contact blocks. A temporary parallel circuit may be created where: first circuit comprises the surface power cable and motor winding circuit through the WYE point, and second circuit comprises the surface power cable and pothead circuit through the shorting ring. Next the solenoid actuator may be at maximum travel, where the motor winding pins are fully engaged into the individual contact blocks and the pothead pins are not shorted. A single downhole electrical circuit from surface through the surface power cable and motor winding and motor WYE point may be present. The solenoid actuator may be active during motor operation to maintain the pin slider at its fully extended position. The motor may be operating.

At this point, if there is a well kick, wellbore fluid may pass through the pump from intake to discharge. The pump and motor shaft may accelerate in the pump operating direction causing a voltage surge to occur. The surface variable speed drive may control the voltage surge. After the variable speed drive controls the voltage surge, the motor may operate normally.

Next step in the process of a deployed ESP may be a manual or automatic shutdown of the ESP from the surface variable speed drive. The electrical current flow in the downhole electrical circuit may be stopped. The solenoid actuator may be deactivated. The pin slider may be shifted back to its original position (fully retracted) by the pin slider return springs. The motor pins may disengage from individual contact blocks and the pothead pins may be shorted again through the shorting ring. The motor winding may be disconnected from the surface power cables. From here, the power cable is safe, and the process may end.

Figure 21:
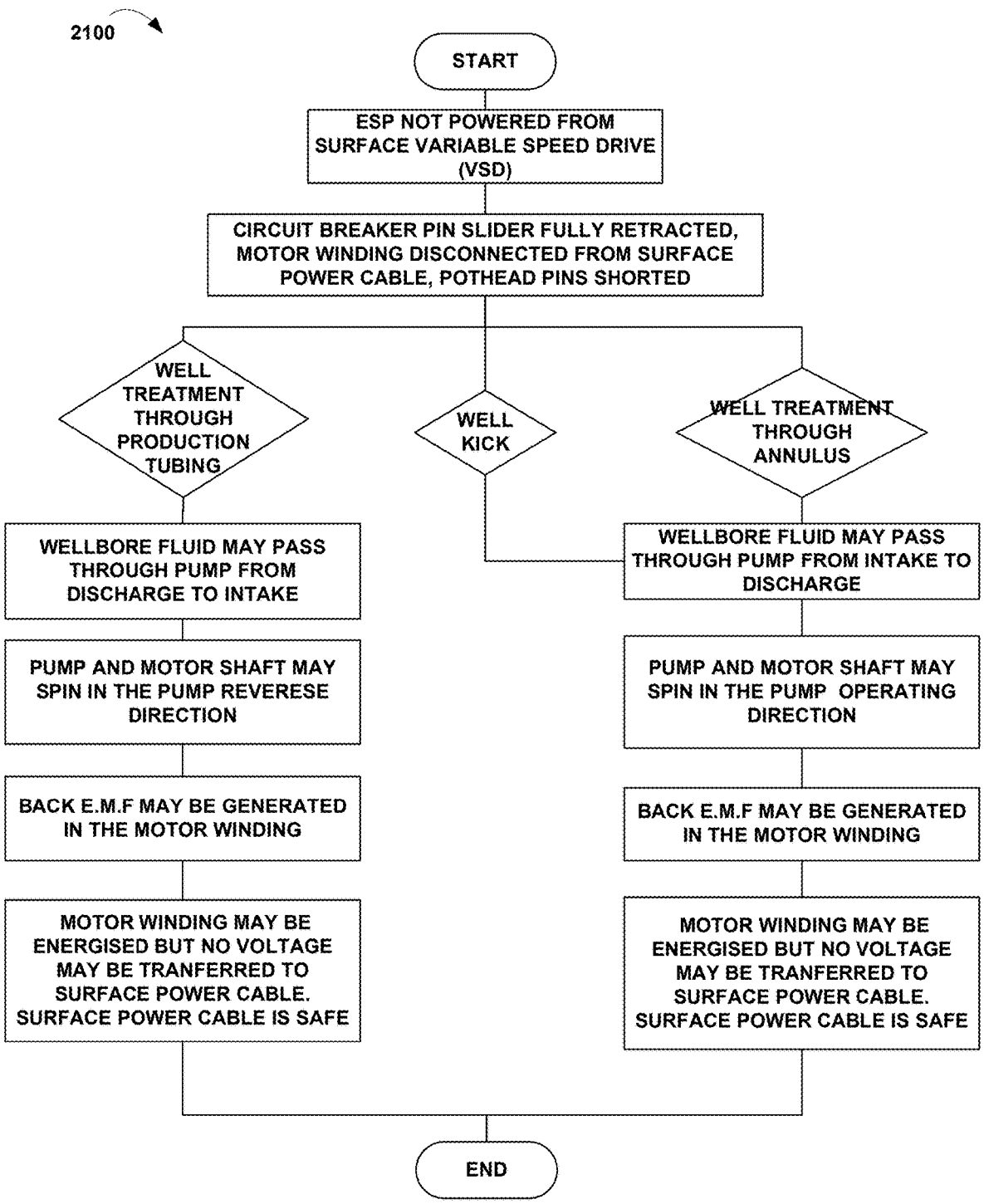
FIG. 21 is a flowchart showing operations of the current controlled circuit braker during well treatment operation.

FIG. 21 is a flowchart showing example operation of the circuit breaker assembly 300 during well treatment operations (i.e., chemical injection, well cleaning, etc.). The flowchart 2100 may begin with the ESP not powered from the surface variable speed drive. The circuit breaker pin slider may be fully retracted, and the motor winding may be disconnected from the surface power cable. Also, the pothead pins may be shorted. From this point, the process may take different paths depending on conditions.

If there is a well treatment operation through the production tubing, wellbore fluid may pass the pump from discharge to the intake. The pump and motor shaft may spin in the pump reverse direction. Back E.M.F may be generated in the motor winding. The motor winding may be energized but no voltage may be transferred to the surface power cable, so the surface power cable may be safe. From here, the process may end.

If there is a well treatment operation through the annulus, the fluid may pass through the pump from intake to discharge. The pump and motor shaft may spin in the pump operating direction. Back E.M.F may be generated in the motor winding. The motor winding may be energized but no voltage may be transferred to the surface power cable, so the surface power cable may be safe. From here, the process may end.

If there is a well kick, the process may perform the same operations as if there were well treatment operation through the annulus (see discussion above).

Figure 22:
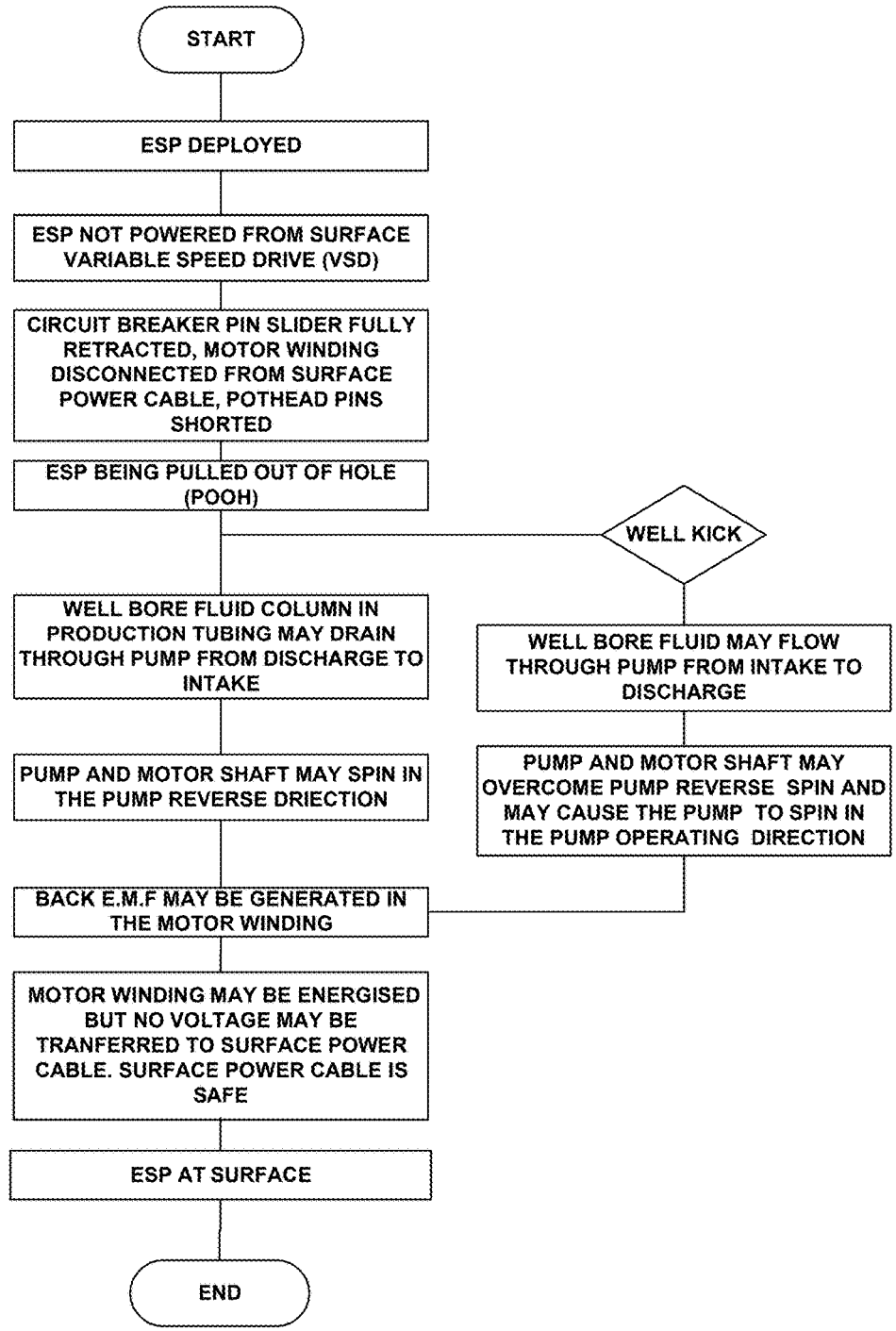
FIG. 22 is a flowchart showing operations of the current controlled circuit braker while ESP pulled out of hole (POOH).

FIG. 22 is a flowchart showing example operation of the circuit breaker assembly 300 during the ESP retrieval from a well (pull out of hole or POOH). The flowchart 2200 may begin with the ESP being deployed. The ESP may not be powered from the surface variable speed drive. The circuit breaker pin slider may be fully retracted, and the motor winding may be disconnected from the surface power cable. Also, the pothead pins may be shorted. The ESP may be pulled out of the borehole.

During the pull, the wellbore fluid in the production tubing may drain through the pump from discharge to the intake. The pump and motor shaft may spin in the pump reverse direction. Back E.M.F may be generated in the motor winding. The motor winding may be energized but no voltage may be transferred to the surface power cable, so that the surface power cable may be safe. Next, the ESP is at the surface. From here, the process may end.

If there is a well kick, wellbore fluid may flow through the pump from intake to discharge at elevated velocity. This sudden flow may push fluid from the pump intake to the discharge, and it may overcome the pump reverse spin caused by the wellbore fluid drainage from the production tubing. This causes the pump to spin in the pump operating direction. From here, the process may continue with back E.M.F being generated in the motor winding. The motor winding may be energized but no voltage may be transferred to the surface power cable, so the surface power cable may be safe. Next, the ESP is at the surface. From here, the process may end.

Figure 23:
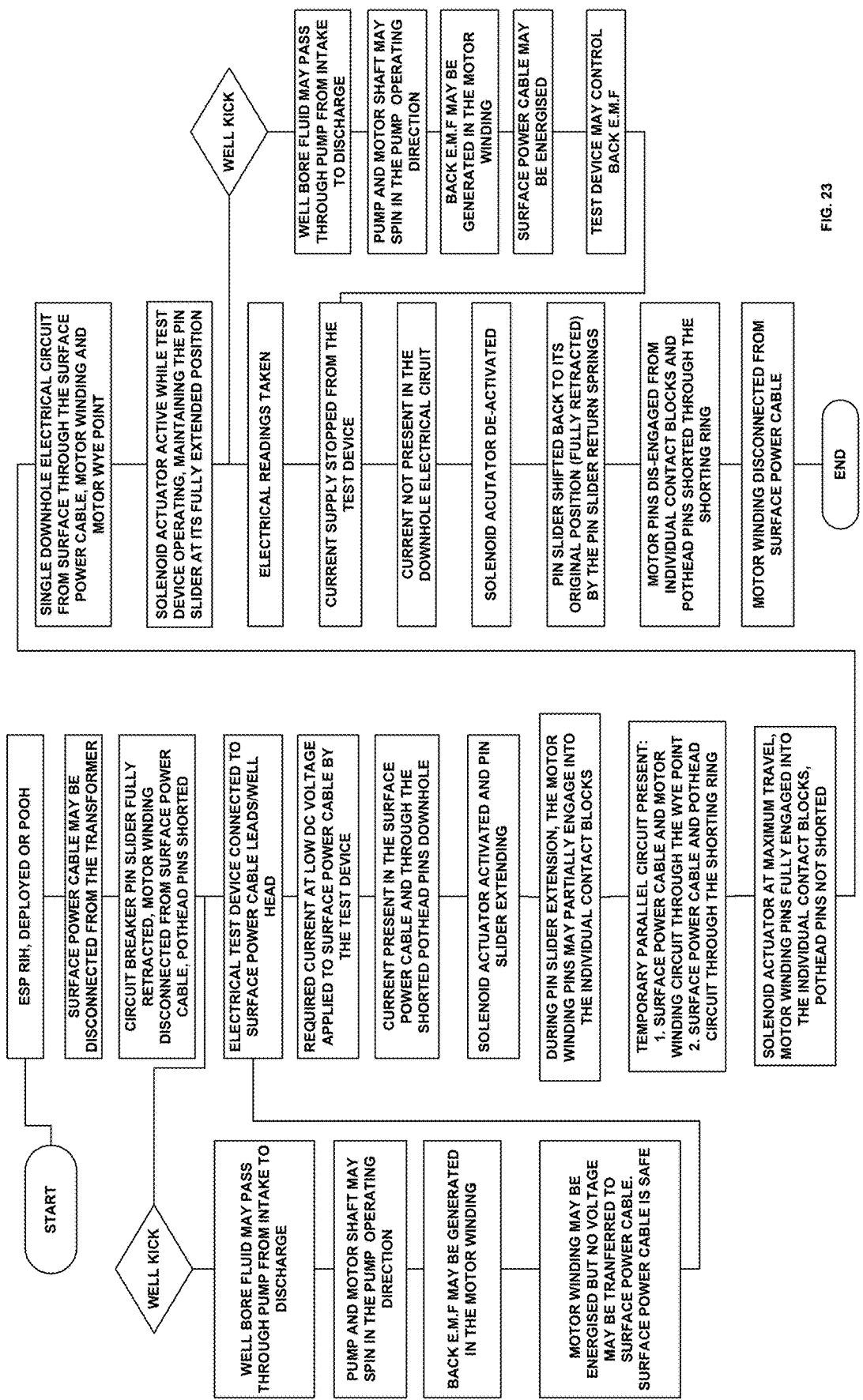
FIG. 23 is a flowchart showing operations of the current-controlled circuit braker during ESP electrical integrity test process.

FIG. 23 is a flowchart showing example operation of the circuit breaker assembly 300 during the ESP electrical testing while RIH, deployed or POOH. The flowchart 2300 may begin with the ESP running into the borehole, the ESP deployed in the borehole, or the ESP being pulled out of the borehole. The surface power cable may be disconnected from the transformer. The circuit breaker pin slider may be fully retracted, and the motor winding disconnected from the surface power cable. Also, the pothead pins may be shorted. At this point, there may be a well kick.

If there is a well kick, wellbore fluid may pass through the pump from the pump intake to discharge. The pump and motor shaft may spin in the pump operating direction. Back E.M.F may be generated in the motor winding. The motor winding may be energized but no voltage may be transferred to the surface power cable, so the surface power cable may be safe. From here, the process may follow the description below.

The electrical test device may be connected to the surface power cable leads and wellhead. A current at low DC (direct current) voltage may be applied to the surface power cable by the test device. There may be electrical current flowing through the surface power cable and through the shorted pothead pins located down hole. The solenoid actuator may be activated, and the pin slider may extend. During the pin's extension, the motor winding pins may partially engage into the individual contact blocks. A temporary parallel circuit may be present. Hence there may be a surface power cable and motor winding circuit through the motor WYE point, and there may be a surface power cable and pothead circuit through the shorting ring.

Next, the solenoid actuator may be at maximal travel and the motor winding pins may be fully engaged into the individual contact blocks. Also, the pothead pins may not be shorted at this point.

A single downhole electrical circuit may be formed from the surface through the surface power cable, the motor winding, and motor WYE point. The solenoid actuator may be active during operation of the test device to maintain the pin slider at its fully extended position.

If there is no well kick, electrical readings may be taken by the test device. After readings are taken, the current supply may be stopped from the test device and current flow may not be present in the downhole electrical circuit. The solenoid actuator may be deactivated. The pin slider may be shifted back to its original position (fully retracted) by the pin slider return springs. The motor winding pins may disengage from individual contact blocks and the pothead pins may be shorted through the shorting ring. The motor windings may be disconnected from the surface power cable, so the surface power cable may be safe. From here, the flow may end.

If there is a well kick, wellbore fluid may pass through the pump from intake to discharge. The pump and motor shaft may spin in the pump operating direction. Back E.M.F may be generated in the motor winding. The surface power cable may be energized. The test device may control back-EMF in the surface power cable. The test device may stop the current supply. Current may not be present in the downhole electrical circuit. The solenoid actuator may be deactivated. The pin slider may be shifted back to its original position (fully retracted) by the pin slider return springs. The motor pins may disengage from individual contact blocks and pothead pins may be shorted through the shorting ring. The motor windings may be disconnected from the surface power cable, so the surface power cable may be safe. From here, the flow may end. The process may be repeated from start after the well kick subsides General Comments FIGS. 1-18 and the components and operations in FIGS. 19-23 described herein are examples meant to aid in understanding example implementations and should not be used to limit the potential implementations or limit the scope of the claims.

As used herein, a phrase referring to "at least one of" a list of items refers to any combination of those items, including single members. As an example, "at least one of: a, b, or c" is intended to cover: a, b, c, a-b, a-c, b-c, and a-b-c.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

The various implementations may include some implementations that have all or any combination of the components and aspects described herein.

Example Clauses

Some implementations may include the following clauses.

Clause 1: An apparatus configured to, in a wellbore, eliminate voltage on one or more first conductors that are electrically connected to a surface-based power source, the apparatus comprising: a shorting ring electrically connectable to the first conductors and configured to electrically short the first conductors upon establishing an electrical connection with the first conductors; a solenoid assembly to actuate in response to power on the first conductors from the surface-based power source; a pin slider assembly connected to the first conductors and configured to move, in response to actuation by the solenoid assembly, between an electrical connection with the shorting ring and an electrical connection with one or more second conductors that have an electrical connection with a permanent magnet motor winding in the wellbore.

Clause 2: The apparatus of clause 1, wherein the surface-based power source is an alternating current power source, the apparatus further comprising: a full wave rectifier electrically connected to the solenoid assembly and configured to convert alternating current from the surfaced-based power source into direct current to cause the solenoid assembly to actuate the pin slider assembly.

Clause 3: The apparatus of any one or more of clauses 1-2 further comprising a current transformer electrically coupled to each of the first conductors and connected to the full wave rectifier and configured to step-up or step-down the alternating current.

Clause 4: The apparatus of any one or more of clauses 1-3, wherein the electrical connection with the shorting ring eliminates the electrical connection with the second conductors.

Clause 5: The apparatus of any one or more of clauses 1-4, wherein the electrical connection with the second conductors includes a connection between an electrical pin of the pin slider assembly and a motor lead extension connected to a permanent magnet motor winding in the wellbore Clause 6: The apparatus of any one or more of clauses 1-5, wherein the pin slider assembly further includes one or more springs configured to move pins from the electrical connection with the second conductors back to the electrical connection with the shorting ring in response to losing power from the surface-based power source Clause 7: The apparatus of any one or more of clauses 1-6, wherein the solenoid assembly is configured to move the pin slider assembly from the electrical connection with the first conductors to the electrical connection with the second conductors in response to current flowing from the surface-based power source.

Clause 8: A system for use in a wellbore, the system comprising: a permanent magnet motor disposed in the wellbore; a circuit breaker assembly configured to eliminate voltage on one or more first conductors that are electrically connected to a surface-based power source, the circuit breaker including a shorting device electrically connectable to the first conductors and configured to electrically short the first conductors upon establishing an electrical connection with the first conductors; a solenoid assembly to actuate in response to power on the first conductors from the surface-based power source; and a pin slider assembly connected to the first conductors and configured to move, in response to actuation by the solenoid assembly, between an electrical connection with the shorting device and an electrical connection with one or more second conductors that are electrically connected to the permanent magnet motor winding.

Clause 9: The system of clause 8 wherein the circuit breaker assembly includes: a housing adapter; and an interface coupled with the housing adapter and including one or more plug-in connector cavities each including a respective power pin terminals configured to connect with a motor lead extension.

Clause 10: The system of any one or more of clauses 8-9 further comprising: a flanged crossover assembly configured to couple the circuit breaker to a stator; and a rotating shaft of the permanent magnet motor passing through the circuit breaker to connect with the stator.

Clause 11: The system of any one or more of clauses 8-10, wherein the circuit breaker assembly further includes: a shaft configured to connect with the shaft that has a mechanical connection with the permanent magnet motor.

Clause 12: The system of any one or more of clauses 8-11 further comprising a custom test device electrically connected to a motor winding of the permanent magnet motor through the surface power cable and configured to test integrity of the motor winding during installation of the permanent magnet motor into the wellbore, operation of the permanent magnet motor in the wellbore, and removal of the permanent magnet motor from the wellbore; and an industry standard test device electrically connected to the surface power cable and configured to test integrity of a surface power cable, motor lead extension, the first conductors, and the motor winding.

Clause 13: The system of any one or more of clauses 8-12, wherein the surface-based power source is an alternating current power source, the circuit breaker assembly further comprising: a full wave rectifier electrically connected to the solenoid assembly and configured to convert alternating current from the surfaced-based power source into direct current to cause the solenoid assembly to actuate the pins.

Clause 14: The system of any one or more of clauses 8-13 further comprising a current transformer electrically coupled to each of the first conductors and connected to the full wave rectifier and configured to step-up or step-down the alternating current.

Clause 15: The system of any one or more of clauses 8-14, wherein the electrical connection with the shorting ring eliminates the electrical connection with the second conductors.

Clause 16: The system of any one or more of clauses 8-15, wherein the electrical connection with the second conductors includes a connection between an electrical pin of the pin slider assembly and a motor lead extension connected to a permanent magnet motor winding in the wellbore.

Clause 17: The system of any one or more of clauses 8-16, wherein the pin slider assembly includes springs configured to move pins of first conductors from the electrical connection with the second conductors back to the electrical connection with the shorting ring in response to losing power from the surface-based power source.

Clause 18: The system of any one or more of clauses 8-17, wherein the solenoid assembly is configured to move the pins of the first conductors from the electrical connection with the shorting ring to the electrical connection with the second conductors in response to current flowing from the surface-based power source.

Clause 19: A method for eliminating, in a wellbore, voltage on one or more conductors that are electrically connected to a surface-based power source, the method comprising: moving, in response to power from the surface-based power source, power pins that are connected to the conductors from a first electrical connection with a shorting device to a second electrical connection with motor leads that are connected to a permanent magnet motor winding in the wellbore; and moving, in response to losing the power from the surface-based power source, the power pins from the second electrical connection with motor leads back to the first electrical connection with the shorting device.

Clause 20: The method of any one or more of clauses 15-19, wherein the pins are included in a pin slider assembly connected to the conductors and configured to move, in response to actuation by a solenoid assembly, from the first electrical connection with the shorting device to the second electrical connection with the permanent magnet motor winding extension leads.

Clause 21: The method of any one or more of clauses 15-20, wherein the power pins are included in a pin slider assembly connected to the conductors and configured to move, in response to actuation by a one or more springs, between the second electrical connection with the permanent magnet motor winding extension leads to the first connection with the shorting device.

What is claimed is:

1. An apparatus configured to, in a wellbore, eliminate voltage on one or more first conductors that are electrically connected to a surface-based power source, the apparatus comprising:
   a shorting ring electrically connectable to the first conductors and configured to electrically short the first conductors upon establishing an electrical connection with the first conductors;
   a solenoid assembly to actuate in response to power on the first conductors from the surface-based power source;
   a pin slider assembly connected to the first conductors and configured to move, in response to actuation by the solenoid assembly, between an electrical connection with the shorting ring and an electrical connection with one or more second conductors that have an electrical connection with a permanent magnet motor winding in the wellbore.

2. The apparatus of claim 1, wherein the surface-based power source is an alternating current power source, the apparatus further comprising:
   a full wave rectifier electrically connected to the solenoid assembly and configured to convert alternating current from the surfaced-based power source into direct current to cause the solenoid assembly to actuate the pin slider assembly.

3. The apparatus of claim 2 further comprising:
   a current transformer electrically coupled to each of the first conductors and connected to the full wave rectifier and configured to step-up or step-down the alternating current.

4. The apparatus of claim 1, wherein the electrical connection with the shorting ring eliminates the electrical connection with the second conductors.

5. The apparatus of claim 1, wherein the electrical connection with the second conductors includes a connection between an electrical pin of the pin slider assembly and a motor lead extension connected to an permanent magnet motor winding in the wellbore.

6. The apparatus of claim 1, wherein the pin slider assembly further includes one or more springs configured to move pins from the electrical connection with the second conductors back to the electrical connection with the shorting ring in response to losing power from the surface-based power source.

7. The apparatus of claim 1, wherein the solenoid assembly is configured to move the pin slider assembly from the electrical connection with the first conductors to the electrical connection with the second conductors in response to current flowing from the surface-based power source.

8. A system for use in a wellbore, the system comprising:
   a permanent magnet motor disposed in the wellbore;
   a circuit breaker assembly configured to eliminate voltage on one or more first conductors that are electrically connected to a surface-based power source, the circuit breaker including:

a shorting device electrically connectable to the first conductors and configured to electrically short the first conductors upon establishing an electrical connection with the first conductors;

a solenoid assembly to actuate in response to power on the first conductors from the surface-based power source; and a pin slider assembly connected to the first conductors and configured to move, in response to actuation by the solenoid assembly, between an electrical connection with the shorting device and an electrical connection with one or more second conductors that are electrically connected to the permanent magnet motor winding.

9. The system of claim 8, wherein the circuit breaker assembly includes:

a housing adapter; and an interface coupled with the housing adapter and including one or more plug-in connector cavities each including a respective power pin terminals configured to connect with a motor lead extension.

10. The system of claim 8 further comprising:

a flanged crossover assembly configured to couple the circuit breaker to a stator; and a rotating shaft of the permanent magnet motor passing through the circuit breaker to connect with the stator.

11. The system of claim 8, wherein the circuit breaker assembly further includes:

a shaft configured to connect with the shaft that has a mechanical connection with the permanent magnet motor.

12. The system of claim 8 further comprising:

a custom test device electrically connected to a motor winding of the permanent magnet motor through the surface power cable and configured to test integrity of the motor winding during installation of the permanent magnet motor into the wellbore, operation of the permanent magnet motor in the wellbore, and removal of the permanent magnet motor from the wellbore; and an industry standard test device electrically connected to the surface power cable and configured to test integrity of a surface power cable, motor lead extension, the first conductors, and the motor winding.

13. The system of claim 8, wherein the surface-based power source is an alternating current power source, the circuit breaker assembly further comprising:

a full wave rectifier electrically connected to the solenoid assembly and configured to convert alternating current from the surfaced-based power source into direct current to cause the solenoid assembly to actuate the pins.

14. The system of claim 13 further comprising:

a current transformer electrically coupled to each of the first conductors and connected to the full wave rectifier and configured to step-up or step-down the alternating current.

15. The system of claim 8, wherein the electrical connection with the shorting ring eliminates the electrical connection with the second conductors.

16. The system of claim 8, wherein the electrical connection with the second conductors includes a connection between an electrical pin of the pin slider assembly and a motor lead extension connected to a permanent magnet motor winding in the wellbore.

17. The system of claim 8, wherein the pin slider assembly includes springs configured to move pins of first conductors from the electrical connection with the second conductors back to the electrical connection with the shorting ring in response to losing power from the surface-based power source.

18. The system of claim 8, wherein the solenoid assembly is configured to move the pins of the first conductors from the electrical connection with the shorting ring to the electrical connection with the second conductors in response to current flowing from the surface-based power source.

19. A method for eliminating, in a wellbore, voltage on one or more conductors that are electrically connected to a surface-based power source, the method comprising:

moving, in response to power from the surface-based power source, power pins that are connected to the conductors from a first electrical connection with a shorting device to a second electrical connection with motor leads that are connected to a permanent magnet motor winding in the wellbore; and moving, in response to losing the power from the surface-based power source, the power pins from the second electrical connection with motor leads back to the first electrical connection with the shorting device.

20. The method of claim 19, wherein the pins are included in a pin slider assembly connected to the conductors and configured to move, in response to actuation by a solenoid assembly, from the first electrical connection with the shorting device to the second electrical connection with the permanent magnet motor winding extension leads.

21. The method of claim 19, wherein the power pins are included in a pin slider assembly connected to the conductors and configured to move, in response to actuation by a one or more springs, between the second electrical connection with the permanent magnet motor winding extension leads to the first connection with the shorting device.

\* \* \* \* \*